US008966368B2

(12) United States Patent

Kuramura

(10) Patent No.: US 8,966,368 B2

(45) Date of Patent: *Feb. 24, 2015

(54) INTELLIGENT CONSOLE FOR CONTENT-BASED INTERACTIVITY

(75) Inventor: Don Yamato Kuramura, San Diego, CA (US)

(73) Assignee: TIBCO Software Inc., Palo Alto, CA (US)

( * ) Notice: Subject to any disclaimer, the term of this patent is extended or adjusted under 35 U.S.C. 154(b) by 1165 days.

This patent is subject to a terminal disclaimer.

(21) Appl. No.: 12/906,862

(22) Filed: Oct. 18, 2010

(65) Prior Publication Data

US 2011/0231428 A1 Sep. 22, 2011

Related U.S. Application Data

(63) Continuation of application No. 09/518,480, filed on Mar. 3, 2000, now Pat. No. 7,823,066.

(51) Int. Cl.

*G06F 17/30* (2006.01)

*G06Q 30/00* (2012.01)

(52) U.S. Cl.

CPC ............. *G06Q 30/00* (2013.01); *Y10S 715/968* (2013.01); *Y10S 715/972* (2013.01)

USPC ........... 715/717; 715/201; 715/742; 715/968; 715/972

(58) Field of Classification Search

CPC .................................................. H04N 21/4622

USPC .................................................. 715/202, 704

See application file for complete search history.

(56) References Cited

U.S. PATENT DOCUMENTS

| | | | |
|---|---|---|---|
| 5,109,425 | A | 4/1992 | Lawton |
| 5,170,440 | A | 12/1992 | Cox |
| 5,237,648 | A | 8/1993 | Mills et al. |
| 5,259,037 | A | 11/1993 | Plunk |
| 5,574,845 | A | 11/1996 | Benson et al. |
| 5,655,117 | A | 8/1997 | Goldberg et al. |
| 5,689,697 | A | 11/1997 | Edwards et al. |
| 5,708,767 | A | 1/1998 | Yeo et al. |
| 5,729,471 | A | 3/1998 | Jain et al. |
| 5,752,244 | A | 5/1998 | Rose et al. |

(Continued)

OTHER PUBLICATIONS

U.S. Appl. No. 60/168,769, filed Dec. 6, 1999.

(Continued)

*Primary Examiner* — Namitha Pillai

(74) *Attorney, Agent, or Firm* — Baker & McKenzie LLP

(57) ABSTRACT

The intelligent console method and apparatus of the present invention includes a powerful, intuitive, yet highly flexible means for accessing a multi-media system having multiple multi-media data types. The present intelligent console provides an interactive display of linked multi-media events based on a user's personal taste. The intelligent console includes a graph/data display that can provide several graphical representations of the events that satisfy user queries. The user can access an event simply by selecting the time of interest on the timeline of the graph/data display. Because the system links together all of the multi-media data types associated with a selected event, the intelligent console synchronizes and displays the multiple media data when a user selects the event. Complex queries can be made using the present intelligent console. The user is alerted to the events satisfying the complex queries and if the user chooses, the corresponding and associated multi-media data is displayed.

12 Claims, 8 Drawing Sheets

(56) References Cited

U.S. PATENT DOCUMENTS

| | | | |
|---|---|---|---|
| 5,805,806 | A | 9/1998 | McArthur |
| 5,818,935 | A | 10/1998 | Maa |
| 5,821,945 | A | 10/1998 | Yeo et al. |
| 5,832,499 | A | 11/1998 | Gustman |
| 5,884,056 | A | 3/1999 | Steele |
| 5,893,110 | A | 4/1999 | Weber et al. |
| 5,900,867 | A | 5/1999 | Schindler et al. |
| 6,144,375 | A | 11/2000 | Jain et al. |
| 6,317,784 | B1 | 11/2001 | Mackintosh et al. |
| 6,401,075 | B1 | 6/2002 | Mason et al. |
| 6,427,063 | B1 | 7/2002 | Cook et al. |
| 6,496,843 | B1 | 12/2002 | Getchius et al. |
| 6,542,882 | B1 | 4/2003 | Smith |
| 6,594,682 | B2 | 7/2003 | Peterson et al. |
| 6,631,522 | B1 | 10/2003 | Erdelyi |
| 2002/0010697 | A1 | 1/2002 | Marshall et al. |

OTHER PUBLICATIONS

Arman et al., "Content-based Browsing of Video Sequences", Proceedings of the Second ACM International conference on Multimedia 1994, pp. 97-103.

Holzberg, Carol. S, "Moving Pictures (Eighteen CD-ROM Video Stock Clips)", CD-ROM World, vol. 9, No. 6, p. 60 (4), 1994.

Smoliar et al., "Content-Based Video Indexing and Retrieval", IEEE Multimedia, vol. 12, pp. 62-72, Summer 1994.

Yeo et al., "Rapid Scene Analysis on Compressed Video", IEEE Transactions on Circuits and Systems for Video Technology, vol. 5, No. 6, Dec. 1995.

INTELLIGENT CONSOLE FOR CONTENT-BASED INTERACTIVITY

CROSS-REFERENCE TO RELATED APPLICATION

This application claims priority to and is a continuation of U.S. patent application Ser. No. 09/518,480 filed Mar. 3, 2000, entitled "INTELLIGENT CONSOLE FOR CONTENT-BASED INTERACTIVITY," which is hereby incorporated by reference for all purposes.

BACKGROUND OF THE INVENTION

1. Field of the Invention

This invention relates to multi-media information systems, and more particularly to a method and apparatus for dynamically interacting with and perceiving content-based multi-media data in a multi-media presentation system.

2. Description of Related Art

The traditional model of television and radio uses multiple continuous data streams or frequencies that are transmitted to a receiver. Under this model a user can only perceive one data stream at a time. To find programs of interest a user must manually change video channels. This activity is referred to as "channel surfing" in the modem vernacular. Program listings such as television or radio station guides aid users to find programs of interest. However, a typical program listing only contains cursory information such as the program title, the length of the program, and a brief description thereof.

In some cases, typical program listings are adequate because a user is only interested in one program. However, program listings are inadequate in cases where users are interested in several programs that run concurrently. More specifically, a user may only be interested in certain content or "events" contained within several multi-media programs. For example, a user may want to listen to three "live" college basketball games, game 1, game 2, and game 3, which all start at a particular time. In this example the user is primarily interested in the entire content of game 1. However, the user is also interested in some of the events that may occur during the other two games such as whenever the lead changes. Thus, the user would like to be alerted when the lead changes in either game 2 or game 3 so that the user can change the channel and listen to that game at the time of interest (i.e., when the lead changes). In the traditional model, a user would need to "channel surf" (i.e., constantly switch channels between the 3 games) between the three games in hope of viewing the program content of interest. Thus, the user would most likely miss a large part of the content-based multi-media events that the user wished to view during the three programs. These content-based multi-media events may be very specific. For example, the user may wish to view a 3-point attempt shot by player number five with one minute left in the game when player number five's team is behind by 2 points. The content-based events desired will vary depending upon the personalities and tastes of the various users.

Therefore, a need exists for a system and method that allows users to selectively and dynamically perceive multiple multi-media events based on the content of the events. It is desirable to allow users to interface with a multi-media database and to select conditions for perceiving the multi-media data types within the database based on some user (or system) specified criteria. Also, it is desirable to assist users in dynamically and flexibly varying selection conditions.

In addition to desiring to perceive only certain specific content-based events, users may desire to perceive only certain multi-media data types from a multi-media event. A multi-media event can be represented by a set of associated and corresponding multi-media data types. Multi-media data types include video, static video images, audio, text, statistical, graphic representations, graphic overlays, other data, or any combination of these data types. Users may want to select to perceive or view only certain multi-media data types at different points during the event. For example, suppose a user is interested in a basketball game having video data, audio data, closed-captioning text data, and various statistical data. The user may want to listen to the first half of the basketball game, and view only the closed-captioned text and statistical data of the second half. In the traditional model, a conventional media player such as a radio or television presents only limited multi-media data types in a continuous-time information stream. Thus, the user would need several media players to perceive only the selected multi-media data types. As with the content-based events, the multi-media data types vary depending upon the personalities and tastes of the various users.

Therefore, a need exists for an intelligent console method and apparatus that facilitates greater flexibility and interactivity with users. More specifically, it is desirable to present selected content-based multi-media events in a manner selected by a user.

Conventional methods allow for the perception of entire multi-media programs in a continuous stream of data. These continuous streams of data can be archived on any well-known devices such as videocassette recorders (VCR), digital videodiscs (DVD), laser discs, read/write compact discs, audio tape recorders, digital audiotapes (DAT), and transcription devices. These devices allow playback based mainly on time or track indices. Disadvantageously, users are only allowed to control the flow of data by pressing buttons such as play, pause, fast forward or reverse. These controls essentially provide the user only one choice for a particular segment of a recorded multi-media program: the viewer can either perceive the data (albeit at a controllable rate), or skip it. However, due to time and bandwidth restraints (especially when a video or audio data type is transmitted over a computer network such as the well-known Internet), it is desirable to provide multi-media users improved and flexible control over the multi-media content to be perceived. For example, in a sports context, a particular user may only be interested in activities performed by a particular player, or in unusual or extraordinary plays (such as a three-point shot, fumble, goal, etc.). Such events are commonly referred to as "highlights".

By providing "content-based" interactivity to a multi-media database, users can query the system to perceive only those plays or events that satisfy a particular query. For example, a user can query such a system to view the video and statistical data of all of the home runs hit by a particular player during a particular time period. Thus, rather than sifting through (by fast forwarding or reversing for example) a large portion of video and statistical information to find an event of interest, users can use a flexible and dynamic content-based query system to find events of interest. This not only saves the user time and energy, but it could also vastly reduce the amount of bandwidth required when transmitting multi-media data over a bandwidth constrained network. Rather than requiring the transmission of unnecessary data content, only events of interest and their selected and associated data types arc transmitted over the transmission network. For example, when transmitting over the well-known Internet the invention is particularly useful because the amount of bandwidth available to the user is limited. The content-based multi-media database reduces the amount of bandwidth required during transmission because only the multi-media data of interest to the user is transmitted.

The prior art has yet to teach or suggest such a flexible, dynamic and content-based interactive multi-media system. However, some prior art teachings are remotely related to the present invention. For example, U.S. Pat. No. 5,109,425 to Lawton for a "Method And Apparatus for Predicting the Direction of Movement in Machine Vision" teaches the detection of motion in and by a computer-simulated cortical network, particularly for the motion of a mobile rover. Although motion detection may be used to track objects under view and to build a video database for viewing by a user/viewer, the present invention is not limited to using the motion detection method taught by Lawton. Rather, a multiple multi-media database can be used with the present invention without departing from the scope of the present claims. The video database of Lawton is limited to video images.

Similarly, U.S. Pat. No. 5,170,440 to Cox for "Perceptual Grouping by Multiple Hypothesis Probabilistic Data Association" describes the use of a computer vision algorithm. However, in contrast to the system taught by Cox, the intelligent console system adapted for use with the present invention selects content based on user desires. Also, the system taught by Cox is limited to video images. In contrast, the present invention can be used with multiple multi-media data types and multiple events within a multi-media program.

Other prior art relate to the coordinate transformation of video image data. For example, U.S. Pat. No. 5,259,037 to Plunk for "Automated Video Imagery Database Generation Using Photogrammetry" describes the conversion of forward-looking video or motion picture imagery into a database particularly to support image generation of a "top down" view. U.S. Pat. No. 5,237,648 to Cohen for an "Apparatus And Method for Editing A Video Recording by Selecting and Displaying Video Clips" shows and describes some of the concerns, and desired displays, presented to a human video editor. Disadvantageously, the systems taught by Plunk and Cohen have rudimentary and limited data types. In contrast, the present invention can be used with multiple multi-media data types and multiple events within a multi-media program.

Arguably, the most relevant prior art to the present invention is U.S. Pat. No. 5,729,471 to Jain et al. for "Machine Dynamic Selection of one Video Camera/Image of a Scene from Multiple Video Cameras/Images of the Scene in Accordance with a Particular Perspective on the Scene, an Object in the Scene, or an Event in the Scene", (hereinafter referred to as the '471 patent, and hereby incorporated herein for its teachings on multi-media video systems). The '471 patent teaches a Multiple Perspective Interactive (MPI) video system that provides a video viewer improved control over the viewing of video information. Using the MPI video system, video images of a scene are selected in response to a viewer-selected (i) spatial perspective on the scene, (ii) static or dynamic object appearing in the scene, or (iii) event depicted in the scene. In accordance with the MPI system taught by Jain in the '471 patent, multiple video cameras, each at a different spatial location, produce multiple two-dimensional video images of the real-world scene, each at a different spatial perspective. Objects of interest in the scene are identified and classified by computer in these two-dimensional images. The two-dimensional images of the scene, and accompanying information, are then combined in a computer into a three-dimensional video database, or model, of the scene. The computer also receives a user/viewer-specified criterion relative to which criterion the user/viewer wishes to view the scene.

From the (i) model and (ii) the criterion, the computer produces a particular two-dimensional image of the scene that is in "best" accordance with the user/viewer-specified criterion. This particular two-dimensional image of the scene is then displayed on a video display to be viewed by the user. From its knowledge of the scene and of the objects and the events therein, the computer may also answer user/viewer-posed questions regarding the scene and its objects and events.

The present invention uses systems and sub-systems that are similar in concept to those taught by the '471 patent. For example, the present intelligent console interacts with a database that is similar in concept to that taught in the '471 patent. However, the content of the multi-media database contemplated for use with the present intelligent console invention is much more extensive than that of the '471 patent. Also, the present invention is adapted for use with a logical database. The database automatically creates a content-based and annotated multi-media database that is interacted with by the present intelligent console. In addition, the present inventive intelligent console is more interactive and has improved flexibility as compared to the user interface taught or suggested by the '471 patent.

The system taught by the '471 patent suggests a user interface that allows a user/viewer to specify a specific perspective from which to view a scene. In addition, the user can specify that he or she wishes to view or track a particular object or person in a scene. Also, the user can request that the system display a particularly interesting video event (such as a fumble or interception when the video content being viewed is an American football game). Significantly, the user interface taught by the '471 patent contemplates interaction with a video database that uses a structure that is developed prior to the occurrence of the video event. The video database structure is static and uses a priori knowledge of the location and environment in which the video event occurs. The video database remains static throughout the video program and consequently limits the flexibility and adaptability of the user/viewer interface.

In contrast, the multi-media database developed for use with the present invention is much more dynamic. The database is automatically constructed using multiple multi-media data types. The structure of the database is defined initially based upon a priori information about all multi-media events of interest. However, the database structure is dynamically built by parsing through the structure and updating the database as all of the multi-media events develop. Consequently, the present intelligent console invention has increased flexibility and adaptability and is richer and more diverse than the prior art user interfaces.

The need exists for a system and method for selectively and dynamically accessing multiple multi-media events based on the content of the event. The need exists for allowing users to interface with a multi-media database and select conditions for perceiving multi-media data types within the database based on user (or system) specified criteria. In addition, a need exists for a method and system that allows users to dynamically change the selection of any multiple content-based multi-media event. Also, a need exists for providing users greater flexibility and interactivity with a content-based multi-media system.

It is therefore desirable to provide a system and method that permits users of simultaneous multi-media programs the selection of multiple content-based multi-media events and facilitates alerting users when a selected content-based multi-media event occurs. It is also desirable to provide an intelligent console method and apparatus that facilitates greater flexibility and interactivity with the user in the presentation of various multi-media data types.

Accordingly, it is desirable to provide a multi-media console that provides "content-based" interactivity to a user. Such a console method and apparatus preferably provides interactivity between the user and the multiple multi-media data types that represent various events in a multi-media program. Additionally, it is desirable to provide a method and apparatus that facilitates greater flexibility and interactivity between a user and recorded multi-media programs. The present invention provides such an intelligent console method and apparatus.

SUMMARY OF THE INVENTION

The present invention is a novel method and apparatus for interacting and displaying multiple multi-media programs. The intelligent console method and apparatus of the present invention includes a powerful, intuitive, and highly flexible means for accessing a multi-media system having multiple multi-media data types. The present invention provides an interactive display of linked multi-media events based on users' personal tastes. The intelligent console includes a graph/data display that provides several graphical representations of events that satisfy user queries. In one embodiment, a user can access an event simply by selecting a time of interest on the timeline of the graph/data display. Because the system links together all of the multi-media data types associated with a selected event, the intelligent console synchronizes and displays the multiple media data when a user selects the event. Complex queries can be made using the intelligent console of the present invention. The user is alerted to events satisfying complex queries and if the user so chooses, the corresponding and associated multi-media data is displayed.

In one preferred embodiment the present intelligent console method and apparatus displays audio data via the Internet (or via an "Intranet") to a user in response to a complex user query. In another preferred embodiment the present intelligent console displays audio, video, and closed-captioned text data via the Internet (or an Intranet). In yet another embodiment, the present invention displays multi-media data via high-speed data connections such as satellite communications link systems and cable communications systems.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The present invention is a method and apparatus for providing interactivity with a multi-media presentation system. As described in more detail hereinbelow, the multi-media presentation system preferably has a multi-media database constructed from a plurality of multi-media events represented by multiple multi-media data types. In the preferred embodiment, the present invention provides real-time interaction with simultaneous "live" multi-media programs and previously recorded multi-media programs. More specifically, the multi-media database is preferably continuously constructed as the live program develops. As described in more detail below, during a querying stage, the database can be dynamically queried based upon certain filtering constraints provided by the user. After the querying stage the present invention alerts the user to any multi-media event within the multi-media database that fulfills the user-specified filtering constraints.

Overviews of exemplary multiple multi-media systems adapted for use with the intelligent console of the present invention are provided below. However, those skilled in the computer user interface art will realize that the present intelligent console invention can be adapted for use with any system that provides context-sensitive video, static video images, audio, data and other media information.

Figure 1:
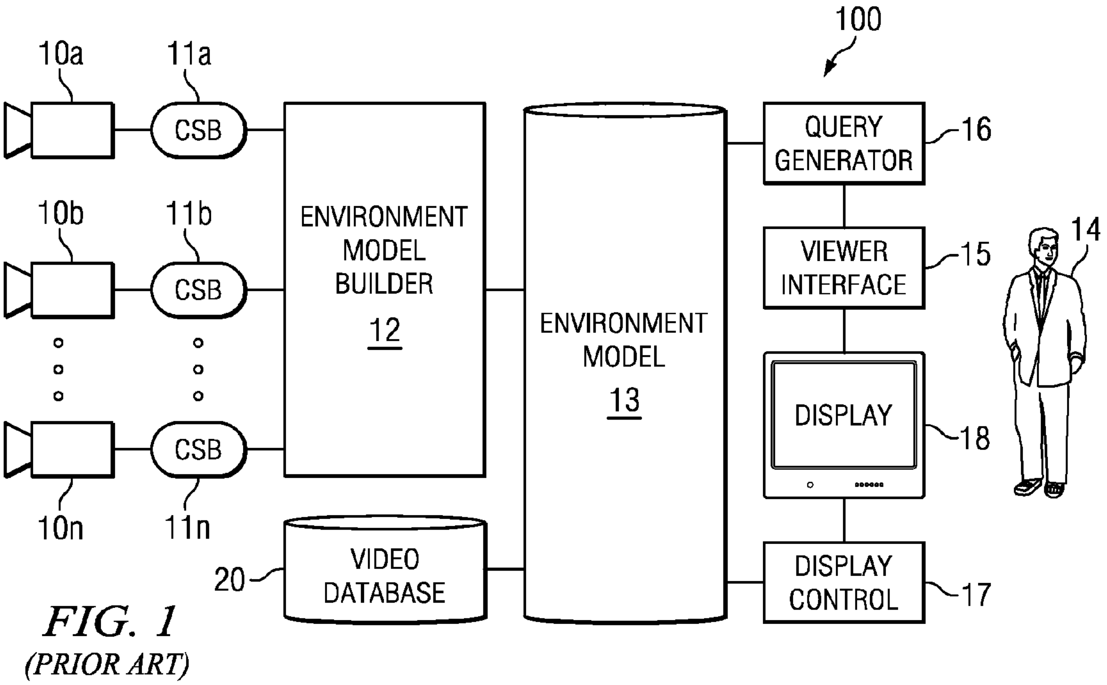
FIG. 1 (PRIOR ART)
FIG. 1 shows a block diagram of a prior art multiple perspective interactive (MPI) video system.

Overview of Interactive Multi-Media Systems for Use with the Present Intelligent Console Invention The Multiple Perspective Interactive (MPI) Video System of the '471 Patent As described above, one exemplary multi-perspective video system that might be adapted for use with the present invention is described in the '471 patent. FIG. 1 shows a block diagram of the multiple perspective interactive (MPI) video system set forth in the '471 patent. As described in the '471 patent, the prior art MPI video system 100 comprises a plurality of cameras 10 (e.g., 10a, 10b, through 10n), a plurality of camera scene buffers (CSB) 11 associated with each camera (e.g., CSB 11a is associated with camera 10a), an environment model builder 12, an environment model 13, a video database 20, a query generator 16, a display control 17, a viewer interface 15 and a display 18. As described in the '471 patent each camera 10a, 10b, . . . 10n images objects from different viewing perspectives. The images are converted into associated camera scenes by the CSBs 11. As described in much more detail in the '471 patent, multiple camera scenes are assimilated into the environment model 13 by a computer process in the environment model builder 12. A user/viewer 14 selects a perspective from which to view an image under view using the viewer interface 15. The perspective selected by the user/viewer is communicated to the environment model 13 via a computer process in the query generator 16. The environment model 13 determines what image to send to the display 16 via the display control 17.

Figure 2:
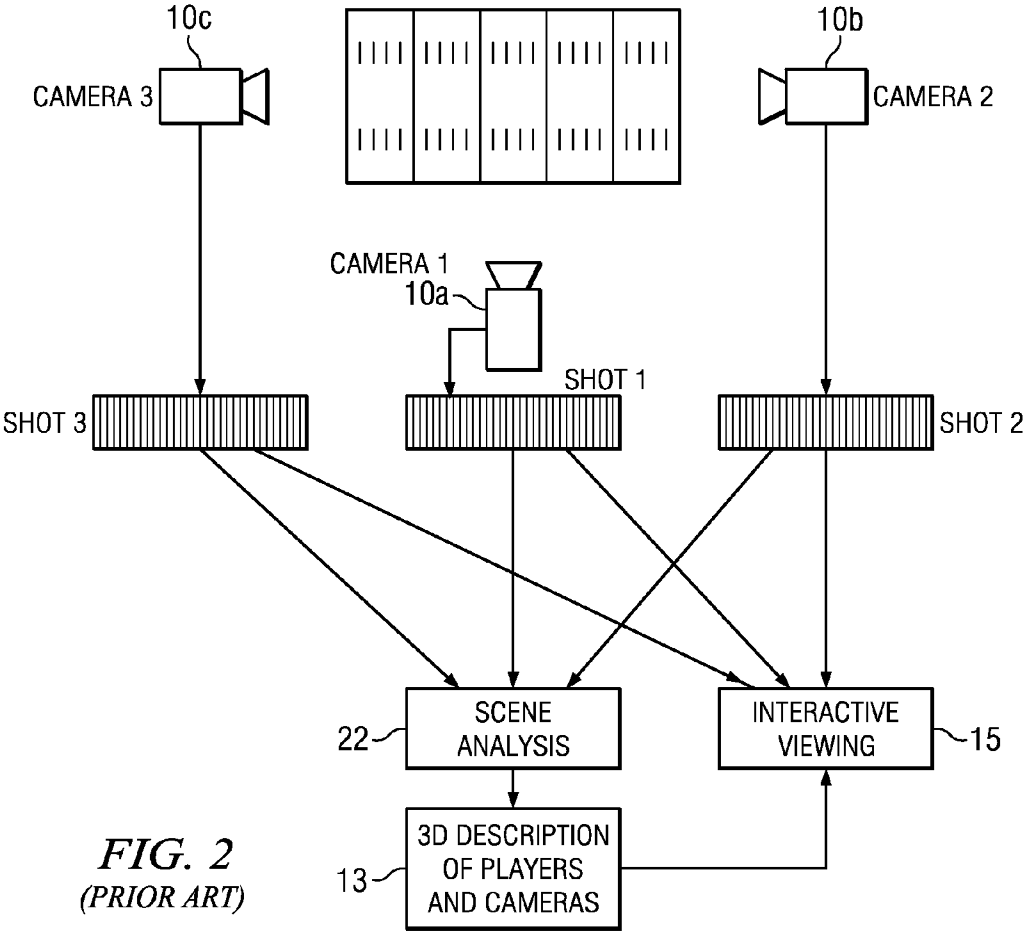
FIG. 2 (PRIOR ART)
FIG. 2 is a functional block diagram of the MPI video system of FIG. 1 used in an interactive football video application.

One particular application of an MPI television system is shown in FIG. 2. As shown in FIG. 2, an American football game is captured by a plurality of cameras 10 (10*a*, 10*b*, and 10*c*) and subsequently analyzed by a scene analysis sub-system 22. The information obtained from the individual cameras 10*a*, 10*b*, and 10*c* is used to form an environment model 13, (The environmental model 13 is a three-dimensional description of the players and camera). The environment model 13 communicates with an interactive viewing block 15 to allow a user/viewer to interactively view the football game imaged by the plurality of cameras 10.

As described in the '471 patent the preferred architecture of an MPI video system depends upon the specific application that uses the system. However, the MPI system should include at least the following seven sub-systems and processes that address certain minimal functions. First, a camera scene builder is required by the MPI video system. In order to convert an image sequence of a camera to a scene sequence the MPI video system must have an understanding of where the camera is located, its orientation, and its lens parameters. Using this information the MPI video system is then able to locate objects of potential interest and the locations of these objects in the scene. For structured applications the MN video system may use some knowledge of the domain and may even change or label objects to make its task easier. Second, as shown in FIG. 1, an environment model builder is required. Individual camera scenes are combined in the MPI video system 100 to form a model of the environment. All potential objects of interest and their locations are recorded in the environment model. The representation of the environment model depends on the facilities provided to the viewer. If the images are segmented properly it is possible to build environment models in real-time (i.e., video refresh rates), or in something approaching real-time.

Third, a viewer interface permits the viewer to select a perspective selected by a user/viewer. This information is obtained from the user/viewer in a directed manner. Adequate tools are preferably provided to the user/viewer to point and to select objects of interest, to select the desired perspective, and to specify events of interest. Fourth, a display controller is required to respond to the user/viewer's requests by selecting appropriate images to be displayed to each such viewer. These images may all come from one perspective, or the MPI video system may select the best camera at every point in time in order to display the selected view and perspective. Accordingly, multiple cameras may be used to display a sequence over time, but at any given instant only a single best camera is used. This requires the capability of solving "camera hand-off" problems.

Fifth, a video database must be maintained by the MPI system. If a video program is not displayed in real-time (i.e., a television program) it is possible to store an entire program in a video database. Each camera sequence is stored along with associated metadata. Some of the metadata is feature based, and permits content-based operations. Feature-based metadata is described in more detail in an article by Ramesh Jain and Arun Hampapur; entitled "Metadata for video-databases" appearing in SIGMOD Records, published in December 1994. Sixth, real-time processing of video must be implemented to permit viewing of real-time video programs such as television programs. Seventh, and last, a visualizer or display is required for those applications requiring the display of a synthetic image to satisfy a user/viewer's request. For example, it is possible that a user/viewer will select a perspective that is not available from any of the plurality of cameras 10. A trivial solution is simply to select the closest camera, and to use its image. Another solution is to select the best, but not necessarily the closest, camera and to use its image and sequence.

As described above in the background to the invention, the content of the multi-media database contemplated for use with the present inventive intelligent console is much more sophisticated than that contemplated by the '471 patent. The system used with the present invention preferably uses a logical database process that automatically creates multiple multi-media data types that are interacted with by the present intelligent console invention. While the system taught by the '471 patent suggests a user interface that allows a user/viewer to specify viewing a program from a specific perspective, the user interface taught by the '471 patent is somewhat limited. For example, the user interface of the '471 patent does not facilitate the synchronization and subsequent complex querying of multiple multi-media data types as taught by the present invention. Therefore, although the '471 patent teaches many of the general concepts used by an interactive system that can be adapted for use with the present inventive intelligent console, a preferred multi-media system (referred to below as the "Presence System") adapted for use with the present invention is described below with reference to FIG. 3. As described below in more detail, the present invention is preferably used with a multi-media system similar in design to the Presence System.

Figure 3:
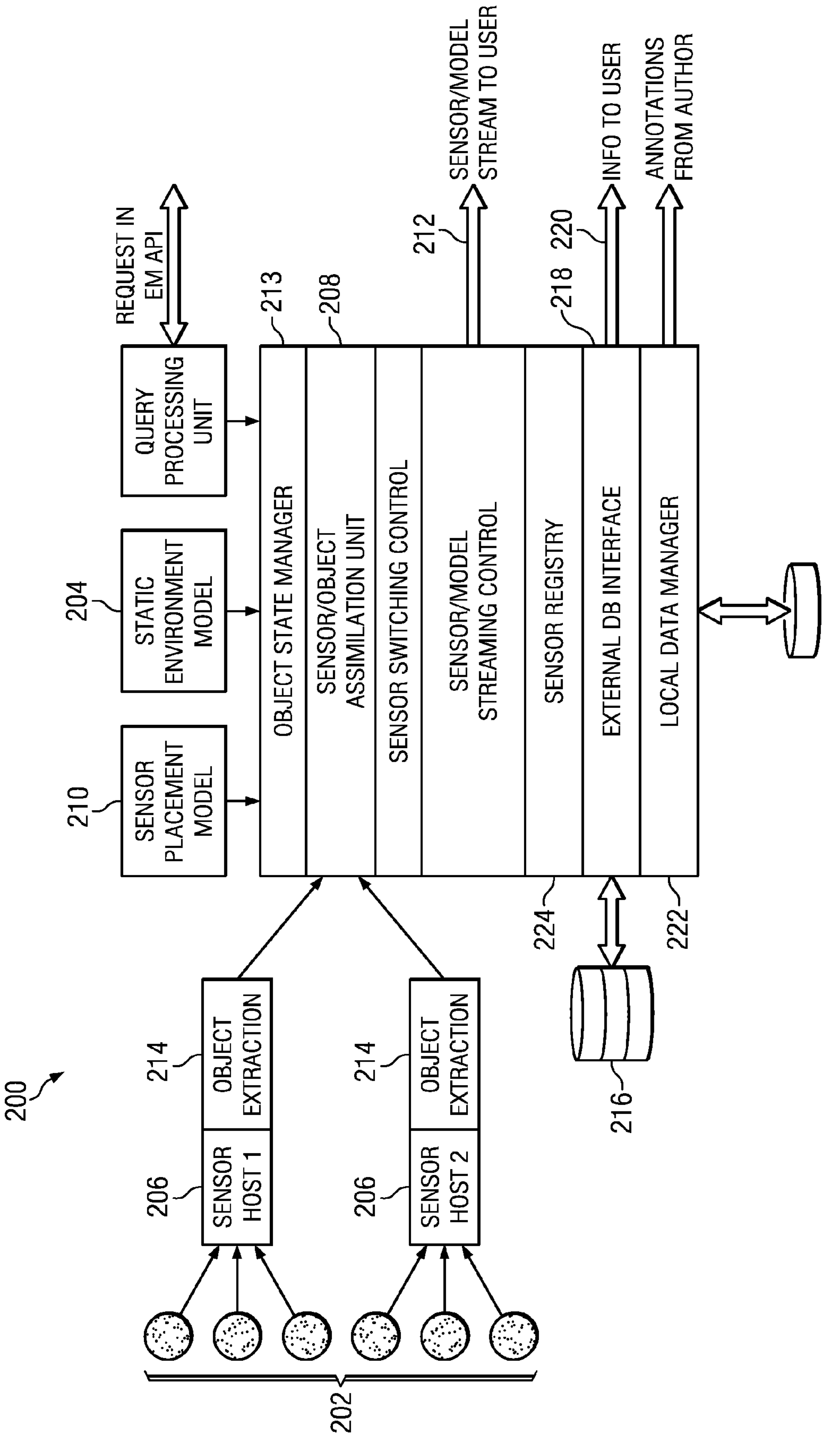
FIG. 3 shows the architecture of a content-based multi-media information system adapted for use with the present intelligent console invention.

The Presence System Multi-Perspective Viewer for Content-Based Interactivity Another exemplary multi-media interactive system that can be adapted for use with the present inventive intelligent console is described in co-pending application Ser. No. 09/134,188 to Jain et al., assigned to the owner of the present invention, hereby incorporated by reference for its teachings on multi-media systems. A system architecture of a content-based, information system offering highly flexible user interactivity is shown in FIG. 3. The multiple multi-media interactive system 200 of FIG. 3 is referred to herein as the "Presence system". The system 200 is so named because it provides users a novel means for interacting with multiple streams of multi-media information. The presence system 200 shown in FIG. 3 (and variations thereof) blends a myriad of technologies such as heterogeneous sensor fusion, live-media delivery, tele-presence, and information processing into a set of functionality. The presence system 200 allows users to perceive, explore, query, and interact with remote, live environments using specially designed client applications. Such diverse applications include, but are not limited to: tele-visiting (e.g., tele-visits to day care centers, assisted living quarters, and other passive observation environs via a networked computer), tele-tourism (e.g., to art museums, galleries, and other interesting attractions), interactive distance entertainment (e.g., concerts, sports events etc.), interactive security systems, next-generation videoconferencing, and advanced and flexible viewing of recorded video and multi-media programming.

The presence system 200 does not simply acquire and passively route sensor content to users as is done by video streamers and Internet or web cameras. Rather, the system 200 integrates all of the sensor inputs obtained from a plurality of sensors 202 and statistical data inputs into a composite model of the live environment. This model, called the Environment Model (EM), is a specialized database that maintains the spatial-temporal state of the complete environment as it is observed from all of the sensors taken together. By virtue of this integration, the EM holds a situationally complete view of the observed space, what may be referred to as a Gestalt view of the environment. Maintenance of this Gestalt view gives users an added benefit in that it is exported to a perception tool at the client end of the system where, accounting for both space and time, it produces a rich, four-dimensional user interface to the real-world environment.

As described in more detail below, the presence system 200 includes software for accessing multi-sensory information in an environment, integrating the sensory information into a realistic representation of the environment, and delivering, upon request from a user/viewer, the relevant part of the assimilated information using the interactive intelligent console of the present invention. The presence system 200 shown in FIG. 3 is capable of supporting content-delivery systems of unprecedented intelligence and scope. The presence system adapted for use with the present invention preferably includes the following mechanisms: (a) sensor switching; (b) object and object property controls; (c) event notification; and (d) information management. Each of these mechanisms is described in turn below.

Sensor Switching Mechanism

The presence system 200 of FIG. 3 preferably includes a sensor switching mechanism that allows the system 200 to process and assimilate input from a variety of sensors 202. The plurality of sensors 202 may include video sensors (i.e., video cameras), audio sensors (i.e., microphones), statistical sensors, motion detectors, proximity sensors, and other sensor types. The sensor switching mechanism provides several advantages. It facilitates the addition of new sensors of the same type and the addition of new sensors having new operating characteristics. It also enables the system to incorporate the specific activation of sensors and signal processing schemes. For example, an infrared sensor may be activated only in low ambient-light conditions, and, for a specific sensor type, a special signal cleaning operation may be invoked, depending on the amount of infrared emission from the static objects or occupants in an environment.

When the system 200 is initially configured, an Environment Model (EM) process builds a skeleton static model 204 of the environment using sensor placement data. From this static model, the EM process can determine an operative range for each sensor 202 in the environment. For example, the EM process will deduce from a sensor's attributes the space in the environment that will be covered when an additional microphone is placed in the environment. During operation of the system 200, the sensor signals are received by a plurality of sensor hosts 206 associated with each sensor 202. The sensor hosts 206 comprise software servers that recognize the source of the sensor input data. In addition, the sensor hosts 206 may include signal processing routines necessary to process the sensor input signals. Each sensor host 206 transmits the sensor information, accompanied by a sensor identifier that identifies the appropriate sensor 202, to a sensor assimilation module 208. The sensor assimilator 208 uses a sensor placement model 210 to index an input with respect to space, and, if memory permits, with respect to time.

A user/viewer can select a given sensor 202 either by referencing its identifier or by specifying a spatial region and sensor type. In the latter case, the query uses knowledge about the sensor coverage information to determine which sensors 202 cover a specific region, and returns only the sensor of the requested type. The request is processed by switching the current sensor to the requested sensors and streaming them to a user via a distribution network 212. As described in more detail below with reference to the description of the present intelligent console, the user's display can present the outputs from one or more sensors. Depending upon the user application, the user interface will include a tool for selecting a spatial region of interest. In many applications, such as security monitoring of a small commercial environment, users may not constantly view a sensor stream. In fact, users might use a scheduler script that invokes a fixed pattern of sensors for a predetermined (or user-configured) period of time at either fixed or random time intervals. The user interface contemplated for use with the presence system 200 of FIG. 3 is described in more detail below with reference to the description of the present intelligent console invention.

Object and Object Property Mechanisms

The system 200 of FIG. 3 preferably includes mechanisms that specify, extract, and refer to objects and object properties in the EM. An object is defined as an observable entity having a localizable position and spatial extent at any point in time. An object in the EM may be "static", "moveable", or "dynamic". For example, consider a view of a room including walls, a chair, and a person. The wall is defined as static, the chair is moveable, and the person is dynamic. In addition to: its spatial-temporal coordinates, an object may also have properties such as the color and texture. As shown in FIG. 3, the system 200 includes components (specifically, object extraction modules 214, an object state manager 213, and the sensor/object assimilation unit 208) for managing objects and object properties.

The presence system 200 preferably uses a simple yet extensible language for denoting positions, dimensions, containment (e.g., "the chair is inside the room"), and connectivity (e.g., "room A is connected to room B by door C") properties of spatial objects observed by the plurality of sensors 202. Thus, when a moveable object is repositioned, the configuration of the static model 204 is modified accordingly. The static model 204 provides significant semantic advantages. First, users can formulate queries with respect to tangible objects. For example, instead of selecting a sensor by specifying a sensor number or position, users can request (by, for example, using a point and click method) the sensor "next to the bookshelf" or the sensor from which the "hallway can be completely seen." Second, the static model 204 allows for spatial constraints and enables spatial reasoning. For example, a constraint stating that "no object can pass through a wall" may help reduce location errors for dynamic objects.

The presence system 200 of FIG. 3 also has the ability to locate, identify, and interact with dynamic objects. In the simplest case, an identifiable mobile sensor, such as a wearable radio-frequency transmitter, can be used to localize a moving object. The sensor transmits the position of the sensor at every time instant. In the case of a child-care environment, each child could be fitted with such a transmitter. In a security monitoring application, employees and visitors could be fitted with transmitters as part of an identification badge. In these cases, the sensor itself identifies dynamic objects. This obviates any additional computation.

However, when such wearable sensors are undesirable or impractical, object location can be calculated by the system using a plurality of sensors. For example, consider the case of multiple video cameras observing a three-dimensional (3D) scene. If a moving object can be seen by more than two suitably placed cameras, it would be possible to determine an approximate location for the object in 3D space. In this case, localization of objects can be achieved using a two-step computational method. For example, each camera 202 transmits a two-dimensional (2D) video signal to an associated sensor host 206. The sensor host 206, using the object extraction process 214, performs a coarse motion segmentation of the video stream to extract the moving object from the scene. Because the video stream is in 2D camera coordinates, the segmented objects are also extracted in 2D. The sensor host 206 transmits the extracted 2D objects to the sensor/object assimilator module 208, which, with the help of sensor placement information, computes the 3D position and spatial extent of the object. Segmentation errors, occlusions, and objects suddenly appearing from an unobserved part of an environment can lead to generic labeling of objects, such as "object at XY."

Complex queries relating to the objects extracted by the system 200 can be processed by referring to the static model 204 and various object attributes. For example, the system 200 can answer queries such as: "of these two observed objects, which one is object 3 that I saw before and which one is a new unseen object that needs a new identifier?" by referring to the static model and various object attributes. The presence system 200 can deduce the identity of the unknown object by using static model constraints and heuristic information. For example, it might deduce that region 2 is a new object, because object 3 could not have gone through the wall and was not moving fast enough to go through the door and reach region 2.

Spatial-Temporal Database

As the EM locates every object at each instant of time, it forms a state comprising the position, extent, and movement information of all objects taken together. If the state is maintained for a period of time, the EM effectively has an in-memory spatial-temporal database. This database can be used to process user queries involving static and dynamic objects, space, and time. Some example queries that may be processed by the presence system 200 follow. "Where was this object ten minutes ago?" "Did any object come within two feet of the bookcase and stay for more than five minutes? Replay the object's behavior for the last 30 seconds and show the current location of those objects." Many other complex queries can be processed by the preferred system 200 as is described below with reference to the present intelligent console invention.

Best View

Another effect of object localization and, perhaps its most important effect, is the ability of the presence system 200 to provide viewers/users content-based viewing of any object, including dynamic objects. This feature increases the expressive capacity in user interactions by allowing users to view the model space from a direction of their own choosing. Users can also select a sensor-based view based on the objects that are visible by selected sensors. For example, the system 200 can automatically switch sensors based on a user-defined best view of a moving object. In addition, the system can display a sensor stream from a specific object's perspective (for example, in the case of a basketball game, the system 200 can show the user "what the point guard is seeing").

Semantic Labeling and Object Recognition

The system 200 also provides mechanisms that facilitate semantic labeling of objects and object recognition. As described above, an object can be localized by the EM, but it is not automatically identified with a semantic label (i.e., the 3D object number 5 is not automatically associated with the name "John Doe."). Within the system 200 the object label (e.g., "objectnumber 5" in the previous example) uniquely identifies the object. When a user wants to specify the object, the system 200 allows the user to click on a mouse and provide a semantic label associated with the object. In this case, the EM does not maintain its semantic label. In an alternative approach, semantic labeling can be obtained by user annotation. After an object is annotated with a semantic label by the user at the user interface (i.e., at the "client side" of the system), the client-side version maintains the annotation throughout the lifetime of the object.

Those skilled in the machine vision arts will recognize that, while many object recognition techniques can be used in controlled environments, only a few fully automated algorithms are sufficiently robust and fast to be used in "live" or near-real-time environments. However, many well-known object recognition techniques can be effectively used by the presence system 200 of FIG. 3. For example, in one application, a user may draw a circle around an object and ask the system to track it. Such tracking operations typically use sophisticated algorithms in order to be sufficiently robust against object occlusion problems. The presence system 200 preferably uses relatively simple object classification techniques that are based upon computationally efficient object properties. For example, object properties such as 3D aspect ratios, color, and simple texture segmentation can be effectively used to classify and distinguish dynamic objects. For example, these properties can be used by the system 200 to distinguish a human being from a dog, and a player as belonging to team A and not team B (for example, by distinguishing between the color of the player jerseys).

It is also possible to incorporate application-specific domain information when processing raw sensor data in order to extract more meaningful object information. For example, a special segmentation process can replace generic segmentation techniques that extract a dynamic foreground object from the background. The special segmentation process can be used to separate objects having a specific color from everything else in the scene. Similarly, additional information about a selected sensor can help inform the extraction of information from the selected sensor and thereby render the information more meaningful to the system. For example, consider a system 200 having an infrared camera 202. By using information about the detection range and attributes of objects under view, the object recognition task can be greatly simplified. For example, human beings radiate infrared energy within a distinct dynamic range, and therefore they can be easily recognized by the system 200 using one or more infrared cameras.

Event Notification Mechanism

The presence system 200 of FIG. 3 preferably includes an event notification mechanism or process that allows the system to recognize and report meaningful "events". As defined within the presence system 200, an "event" is a spatial-temporal state satisfying pre-defined conditions. Events can occur either instantaneously or over an extended time period. Unlike specific user queries, which users explicitly make from the client side of the system 200 (using the present intelligent console or some other user interface), events are treated as standing queries that the presence system 200 continuously monitors. When the event occurs, the client side of the system is notified by the system 200. In an ideal system, events would be semantic in nature, and actions (such as "touchdown in a football game" and "vandalism in a surveillance application") would be treated as events. However, in the system 200 shown in FIG. 3, semantic events are constructed from simpler more primitive events. These primitive events are useful in and of themselves.

In one embodiment of the presence system 200, event notification mechanisms are provided using simple periodic queries. In systems having more complex needs, specialized "watcher processes" can be provided for each event. In one embodiment, the watcher processes execute on the sensor hosts 206. Alternatively, the watcher processes execute on an EM server or on the client server (not shown in FIG. 3). Executing the watcher processes on the EM server is advantageous because events can be detected after assimilation of all the pieces of information. However, when higher volumes of requests are present (and it is necessary to monitor larger environments) the processing is preferably distributed. In this embodiment, each sensor host 206 operates on a local environment model associated with each sensor host, and executes its own watcher processes.

Information Management Mechanisms

As described below in more detail, users can supplement the audio/video information provided by the sensors 202 with additional information (e.g., statistical data, text, etc.). As shown in FIG. 3, this additional information is made available to the system 200 via an external database 216 and an external database interface 218. The external database interface 218 exchanges information with an external database 216. When appropriate, the system 200 synchronizes and associates the information in the external database 216 with the data obtained from the plurality of sensors 202. The results of a query from a user are provided to the user over communication path 220. The external database interface 218 provides all of the synchronization processes necessary to communicate with the user via the communication path 220.

In applications having "live" environments, only very specific domain-dependent queries are forwarded to the external data source 216. However, the external database 216 and database interface 218 can also serve as a general gateway to standalone and online databases. Such an architecture is employed when the presence system 200 is used for replaying archived data. For example, as described below in more detail in reference to the description of the present intelligent console invention, in sporting events, users may request the display of player or team statistics in addition to video/audio information. Similarly, in a videoconference application, participants may request electronic minutes of the meeting for specific time intervals. Using the external database interface 218 (and/or the local data manager 222), the presence system facilitates user requests for synchronized multiple multi-media data types.

Communication Architecture

The system shown in FIG. 3 supports both the well-known UDP and HTTP communication protocols. In addition, streaming media can be delivered to a user in a user-selectable form, such as using the well-known "RealVideo®" from RealNetworks® or DirectShow® from Microsoft®. Alternatively, the streaming media can be delivered to a user using any video delivery format that is convenient to the user. In one embodiment, a client interface (not shown) is provided using a "world-wide web" (or Internet) server using well-known communication techniques. In this embodiment, communications with a client process is implemented using the well-known HTTP method or an HTTP-like technique.

System Administration Functions

The presence system 200 performs a significant amount of bookkeeping, including tracking the services requested by each user, monitoring user access privileges, and roles. Of particular importance are access privileges to sensors and views. For example, in the surveillance of a bank, not every employee may have access to cameras installed in the safety vaults. In addition to user management, the system also facilitates the addition of new sensors to the registry (using a sensor registry mechanism 224) and the addition of new services (such as a video streaming service). In one embodiment, administrative functions are implemented using a logically distinct database.

System Tools

The system 200 shown in FIG. 3 includes several system tools that enhance and simplify the use of the system. Exemplary system tools include the following:

Sensor placement and calibration tools

Complex query formulation tools

Authoring tools

Sensor Placement and Calibration Tools

Sensor placement tools allow a site developer and system administrator to position sensors (whose properties are already registered within the system 200) in a virtual environment, and to experiment with the number, types, and locations of sensors, visualizing the results. In an alternative embodiment, the system tools interact with a system administrator to determine system requirements and recommend sensor placement. The sensor calibration tool calibrates the sensors after they have been placed. Thus, for each sensor, the administrator or developer can correlate points in the actual environment (as "seen" by that sensor) to equivalent points in the static environment model 204. In this process, several parameters of the sensors, such as the effective focal length, radial distortions, 3D-orientation information, etc., are computed. Thus, the system 200 can accurately compute the 3D coordinates based upon dynamic objects obtained during a regular session.

Complex Query Formulation Tool

While the EM maintains spatial-temporal states of objects, events, and static information, users need a simple mechanism to query the system for information related to them. Queries must be sufficiently expressive to take advantage of the rich semantics of the content, yet simple to use. To facilitate the query process, the system 200 preferably includes visual tools that enable users to perform simple query operations (such as point and click on an object, a sensor, or a point in space, press a button, mark an area in space, and select from a list). From user inputs to these query formulation tools, complex query templates are "pre-designed" for specific applications. One example of such a query is: "if three or more dynamic objects of type human are simultaneously present in this user-marked area for more than one minute, highlight the area in red and beep the user until the beep is acknowledged." Although the query tool produces an output with several conjunctive clauses and conditions, involving point-in-polygon tests and temporal conditions, users need only perform actions such as marking a region of interest and specifying the number of dynamic objects to launch the complex query. The complex query tool is described below in more detail with reference to the present inventive intelligent console method and apparatus.

Authoring Tools

The system 200 of FIG. 3 preferably includes authoring tools that allow users to create multi-media content using either archival or live-sensory information, or both. This content-creation process preferably comprises authoring tools analogous to the Media Composer® from Avid® or Macromedia Director®, however, using live multi-sensory (and perhaps archival) information. For example, consider the case where a user wants to author a sports show in which significant basketball games of the year 1999 are described. The user would use the system 200, and specifically utilize a "playback" mode and a tool having components capable of composing the show. These components allow the system 200 to perform the following functions:

Provide authors a mechanism for marking highlights and provide end users a mechanism for "jumping" to these highlights ("hypervideo").

Capture 3D snapshots of the game at either regular intervals or at carefully chosen time instants and present them to the end users like a storyboard of key frames, allowing them to play back a game from those time instants.

Pre-compute the tracks (using expensive semi-automatic algorithms, if required) of game scorers and other players assisting or opposing them, such that the end user can follow the game's best view of those movements.

Connect to external information sources to annotate specific objects or events with text, audio, or other video.

Details of the authoring tools and their use in a user interface are provided in more detail below with reference to the inventive intelligent console method and apparatus. A specific adaptation of the presence system 200 of FIG. 3 is now described below with reference to FIGS. 4-6. This adaptation includes a number of preferred embodiments of the present inventive intelligent console. However, those skilled in the user interface and computer arts will recognize that several alternative embodiments of the present console and associated multi-media system may be used without departing from the scope of the present invention.

Figure 4A:
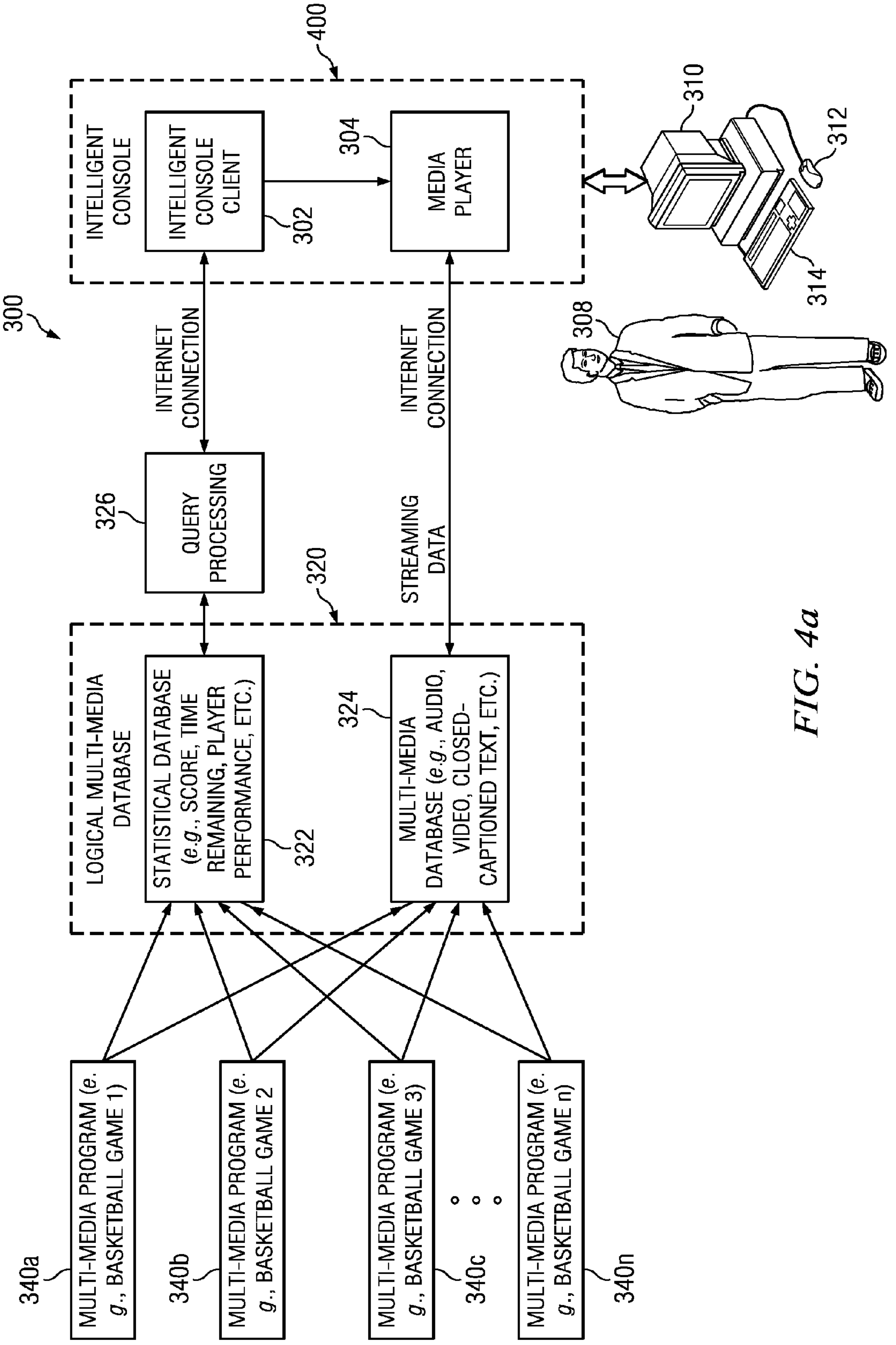
FIG. 4*a* shows a block diagram of the preferred embodiment of the intelligent console method and apparatus of the present invention.

A Preferred Embodiment of the Multi-Media Interactive System for Use with the Present Inventive Intelligent Console In accordance with a preferred embodiment of the present invention, the present intelligent console method and apparatus comprises one of several inventive multi-media processing components of an interactive multi-media system similar to that described above with reference to FIG. 3. The preferred interactive multi-media system for use with the present invention preferably includes three major components or processes as shown in FIG. 4*a*. Throughout the remainder of this detailed description, the preferred interactive multi-media system is described in the context of the 64-team NCAA Men's Division 1 basketball tournament colloquially known as "March Madness". However, the preferred multi-media system and present console invention can be used to facilitate interactivity with a wide range of multi-media programming. Therefore, although the remainder of this detailed description describes the present invention in the context of multiple basketball games played in a single-elimination tournament, those skilled in the art will recognize that the intelligent console can be modified to allow interactivity with several different types of media programs.

Referring to FIG. 4*a*, the preferred embodiment of the inventive Intelligent Console process 400 executes on a computer located at a user/client's home or business. However, the inventive Console process 400 can be executed on other devices such as dedicated hardware (e.g., using a cable box and a satellite decoder) connected to a television set or monitor. The Console 400 preferably causes statistical information and multi-media data to be displayed on a user display 310 to be viewed by a user 308.

As shown in FIG. 4*a*, the preferred interactive multi-media system 300 preferably includes a Logical Multi-media Database Construction process 320, a Query process 326, and an inventive Intelligent Console process 400. In the embodiment shown in FIG. 4*a*, the Logical Database process 320 comprises a Statistical Database process 322 and a Multi-Media Database Construction process 324. In the preferred embodiment, the Intelligent Console process 400 comprises an Intelligent Console Client process 302 and a Media Player process 304. The Statistical Database process 322 works together with the Query process 326 to automatically alert the Intelligent Console Client process 302 of multi-media events that satisfy the conditions of a particular query. As described in more detail below, in the preferred embodiment of the present Intelligent Console invention, the Intelligent Console Client process 302 displays statistical data and cooperates with the Media Player process 304 to play streams of multi-media data chosen by the user.

In one preferred embodiment, streams of multi-media data are gathered from the Multi-Media Database process 324 via the well-known Internet and obtained by the Media Player process 304. Alternatively, streams of data can be gathered from other sources such as cable communication systems, Intranets, and satellite data systems. In the preferred embodiment, the streams of data occur in "real-time" for live events such as basketball games and other sporting programs with only a short retrieval delay (e.g., 15 seconds). Streams of data may also be retrieved from the Multi-Media Database process 324 for previously recorded or "archived" media programs.

Logical Database Process

As shown in FIG. 4*a*, the Logical Database process 320 preferably accepts data input from a plurality of multi-media programs 340*a*-340*n*. Although only a limited number of programs are depicted in FIG. 4*a*, this is not meant as a limitation to the present invention. Those of ordinary skill in the art will appreciate that the amount of programming that can be input to the Logical Database process 320 is limited by hardware, software, and communication constraints. The data inputs accepted by the Logical Database process 320 preferably comprise audio data, video data, closed-captioned text, statistical data, time-reference data, and other relevant data. Similar to the system 200 described above with reference to FIG. 3, based upon the "raw" data input to the Logical Database process 320, the process 320 creates a powerful relational/object-oriented database that synchronizes all of the multi-media data types together and that provides indices to each associated data type.

In one preferred embodiment, the Logical Database process 320 can accept and subsequently synchronize the following diverse input data information streams: (a) multiple "live" audio information streams from a single program (e.g., home team commentary and away team commentary); (b) multiple "live" audio information streams from multiple programs that are geographically separate; (e.g., two basketball games concurrently played in different locations); (c) play-by-play statistical information streams associated with multiple media events; (d) information specific to the media event such as player rosters, statistical data, etc.; (e) any other live inputs obtained by sensors located proximate the media events. All of these diverse data types are linked together by the Logical Database process 320 during the creation of a multiple data type multi-media database.

As stated above, this relational database preferably comprises an object-oriented database. The system 300 effectively includes an environment model that maintains the object-oriented database. As described above, this database can be used to process user queries involving game statistics or other information (e.g., queries regarding the score at a specific time during a game). The details of the creation of this database and implementation of the Logical Database process 320 are beyond the scope of the present intelligent console invention. However, to fully appreciate the flexibility and operation of the present invention, the functions performed by the Logical Database process 320 are described briefly.

As shown in FIG. 4*a*, the system 300 creates a database that synchronizes and associates multiple multi-media data types (such as video, static video images, audio, proximity sensor signals, and statistical information) with multi-media events of interest to an end user or client (such as turnovers, technical fouls, etc.). These data types are preferably stored and managed by the multi-media system in a relational object-oriented multi-media database. Due to the massive storage requirements associated with the audio and video events digitized by the system, a set of filtering criteria are preferably provided which are used to eliminate insignificant events. For example, in a basketball example most plays are not worthy of being perceived. Therefore, as described below in more detail, the Query process 326 filters the data to eliminate events that do not satisfy the criteria specified by the user. For example, in one preferred embodiment, the following filtering criteria can be specified: (a) three-point plays (such as three-point shots and two-point shots with a bonus foul shot); (b) erroneous plays (such as turnovers and technical fouls); (c) extraordinary plays (such as goaltending and blocked shots); (d) key players can be specified (e.g., top scoring player); and (e) other user-defined plays. In the preferred embodiment, the filtering criteria can be established using Boolean operations based upon a set of primitive filtering constraints.

In the preferred embodiment, the Logical Database Construction process 320 comprises the gathering of large amounts of data from multi-media programs and the creating of an indexed multi-media database. The indexed multi-media database is indexed by context-related events that are time referenced (e.g., turnovers and technical fouls). As described in more detail below, in the preferred embodiment these context-related events allow the Query process 326 to automatically alert the Intelligent Console Client process 302 of context-related multi-media events that satisfy the conditions of a particular query. The Logical Database Construction process is referred to as being "logical" because the Statistical Database process 322 and the Multi-Media Database process 324 can be considered as one completely integrated database, even though they are physically separated. However, this is not meant to be a limitation and one of ordinary skill in the art will recognize that the logical database can be a single, fully integrated database residing on the same server. In the embodiment described below, both the Statistical Database 322 and the Multi-Media Database 324 reside on separate servers that can be accessed through the well-known Internet. Alternatively, the database 324 resides on servers that can be accessed via a private or public Intranet.

Statistical Database Process

Referring again to FIG. 4*a*, the Statistical Database process 322 preferably accepts inputs from a plurality of multi-media programs 340*a*-340*n*. Any well-known method of inputting statistical data to a database can be used in the Statistical Database process 322. In the preferred embodiment, a statistician views a multi-media program from a real-time satellite feed and directly inputs statistical data into the Statistical Database 322. Alternatively, the statistician views a pre-recorded multi-media program and inputs the statistical data. In yet another embodiment,the statistical data is input to the Statistical Database 322 by a statistical data-gathering company such as Sports Ticker Stats Inc., Broadcast.com™, and InterVU.net™. Other methods of collecting statistical data are well known to one of ordinary skill in the art and therefore are not described in more detail.

A typical sports multi-media program contains large' amounts of statistical data. Thus, a statistical database tailored to a specific sporting event contains a vast variety of data types. As stated above, the embodiment of the present invention described herein is developed for use with the NCAA Men's Division 1 basketball tournament. The tournament data may include team data, player data, tournament data, tournament round data, basketball game data, play data, player statistics, team statistics, and other data. An exemplary list of these data types is provided below in Table 1.

TABLE 1

Exemplary List of Data Types used by a Basketball Statistical Database

| Team | Players | Tournament Event | Round |
|---|---|---|---|
| Name | Name | Name | Number |
| Nickname | Position | Start Date | No. Teams |
| Short Name | Number | End Date | Start Date |
| Scoreboard Name | Class | Number of Teams | End Date |
| Seed | | | Description |
| Region | | | |
| Coach | | | |

| Basketball Game | Plays | Field Goal | Officials |
|---|---|---|---|
| Home Team | Field Goal | Attempted by | Referee data |
| Away Team | Off. Goaltending | Result | Icons |
| Home Lineup | Def. Goaltending | Assisted by | Descriptions |
| Away Lineup | Off. Rebounding | Point value (2 or 3) | |
| Start Date | Def. Rebounding | | |
| End Date | Block Shot | | |
| Region | Free Throw | | |
| Location | Steal | | |
| Audio Sources | Turnover | | |
| Home Score | Time Out | | |
| Away Score | Foul | | |
| Game Section (e.g., 1st half, 2nd half, etc.) | Jumpball | | |
| Game Clock | | | |

The list of data types in Table 1 is exemplary and not meant to be a limitation to the present invention. One of ordinary skill in the art shall recognize that a user may be interested in other types of statistical data. Also, other sports such as American football and cricket will use different data types due to the differences in rules of play of the sport and variances in user interests.

Multi-Media Database Process

As shown in FIG. 4*a*, the Multi-Media Database process 324 accepts inputs from a plurality of multi-media programs 340*a*-340*n*. These inputs can be audio data, video data, closed-captioned text, or other data. In the preferred embodiment, the inputs comprise real-time data gathered from a plurality of broadcasts of multi-media programs. The embodiment shown in FIG. 4*a* uses well-known streaming technology to send data over the Internet (or, in another alternative, over an Intranet) to the Media Player process 304. The Database process 324 preferably accepts "live" or "raw" data inputs from a plurality of sensors positioned proximate the media event. For example, in the case of a basketball game, the plurality of sensors includes several video cameras positioned at different viewing perspectives around the basketball court. The sensors might also include a plurality of microphones and proximity sensors as described above with reference to the MPI system and the Presence System of FIGS. 1 through 3. Also, the Multi-Media Database process 324 preferably accepts a plurality of audio inputs from professional commentators or broadcasters viewing the basketball game.

For example, audio inputs may comprise home team commentators, away team commentators, or national broadcasters.

In the preferred embodiment the Multi-Media Database 324 may physically reside on the same server or computer as the Statistical Database 322. However, as described in more detail below with reference to FIG. 4*a*, the Multi-Media Database 324 and the Statistical Database 322 reside on separate servers in the exemplary embodiment. The Statistical Database process 322 and the Multi-Media Database process 324 preferably contain time-referenced data. Thus, when the user selects certain time-referenced statistical data via the Query process 326, the Intelligent Console process 400 can play the associated multi-media data types.

As described in more detail below in connection with the Query process, the Query process 326 allows the user 308 to interface with the Intelligent Console 400 to obtain specific data based an events stored in the multi-media database process 320. Events entered or stored in the multi-media database 320 may be generated using either a static process (i.e., by storing information into the database 320 based upon pre-recorded and annotated multi-media programs) or a "live-capture" process. The live capture process used by the present invention to generate events that are stored in the database 320 is now described in more detail with reference to FIG. 4*b*.

Figure 4B:
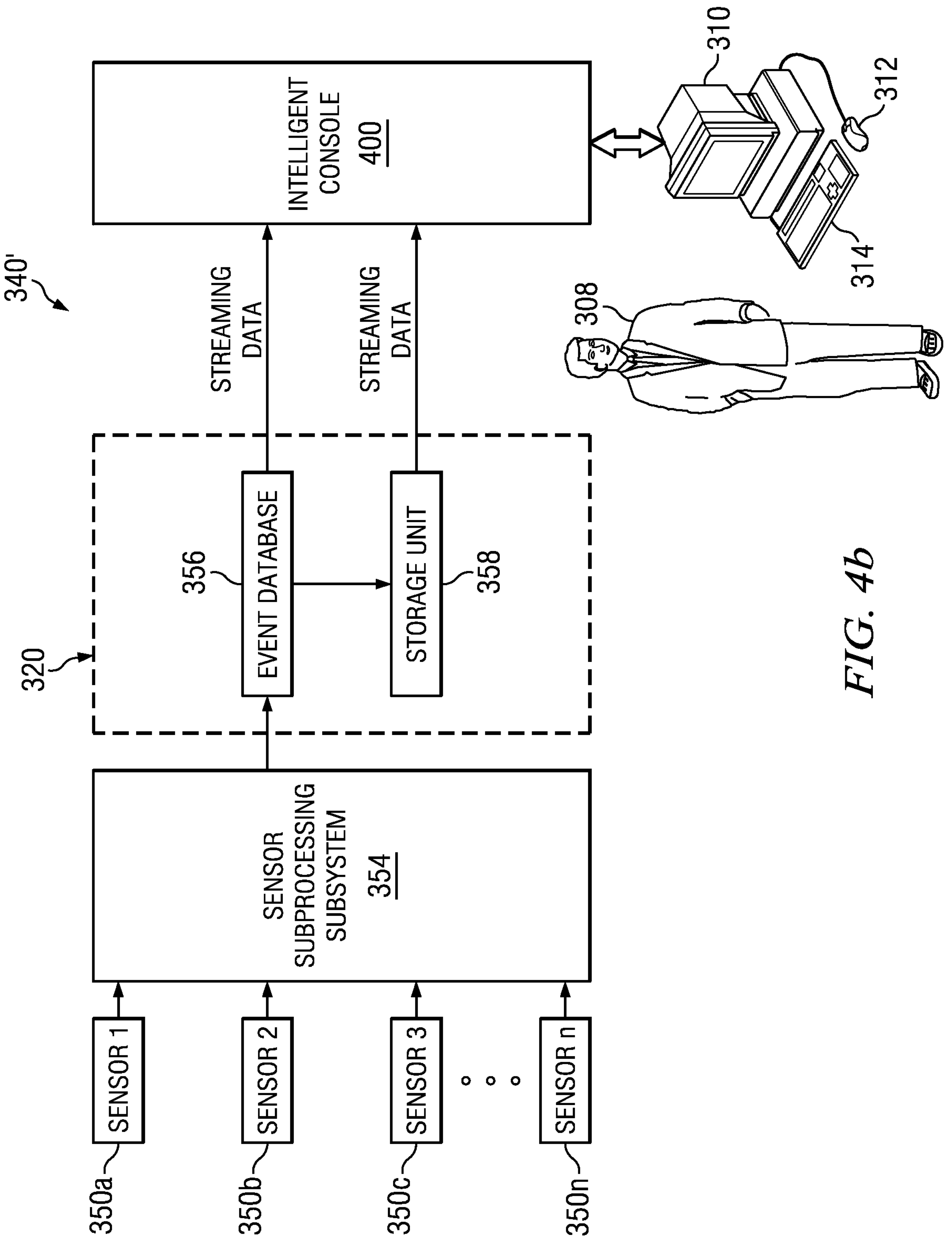
FIG. 4*b* shows a block diagram of the live-capture process used by the present invention to capture and store live multi-media events into the multi-media database of FIG. 4*a*.

FIG. 4*b* shows a block diagram of the "live-capture" process 340' used by the present invention to capture and store "live multi-media events" into the multi-media database 320. "Live-capture" refers to the concept of capturing events from a live multi-media program or a plurality of live multi-media programs in real-time (i.e., in a "live" mode, as the event is occurring). Real-time data can be captured either automatically (i.e., using automated video/audio processing techniques) or manually (i.e., using assistance from a human operator). In the preferred embodiment, a human operator observes a live event and manually enters statistical (and other) attributes relating to and associated with the event. The human operator enters this information as the event occurs.

As shown in FIG. 4*b*, the Sensor Subprocessing Subsystem 354 accepts inputs from a plurality of live multi-media programs 350*a*-350*n*. These inputs can be live audio data, video data, closed-captioned text, or other data. In the preferred embodiment, the inputs comprise real-time data gathered from a plurality of broadcasts of multi-media programs. The Sensor Subprocessing Subsystem 354 preferably accepts the live or raw data inputs from the plurality of sensors positioned proximate the media event. For example, in the case of a basketball game, the plurality of sensors includes several video cameras positioned at different viewing perspectives around the basketball court. The events generated by the Sensor Subprocessing Subsystem 354 are input to an event database 356. Events can be stored in a storage unit 358 for subsequent retrieval by the intelligent console 400. The events can be retrieved from the storage unit 358 when the intelligent console 400 operates in an "archive" mode. Alternatively, events can be directly accessed from the event database 356 when the intelligent console 400 operates in a "live" mode. These two modes of operation of the present inventive intelligent console are now described in more detail.

In the preferred embodiment, the intelligent console method and apparatus can operate in two modes: "live mode" and "archive mode". The "live mode" of operation refers to monitoring multi-media programs and displaying context-based events in real-time as a multi-media program occurs. A slight delay (on the order of a few seconds) can occur during live modes of operation because an event description must be created and data must be stored in the Event Database 356. In the live mode of operation, the intelligent Console 400 interacts with the Event Database 356 to display context-based events. The "archive mode" of operation refers to displaying context-based events of previously recorded multi-media programs. In the archive mode of operation, the Intelligent Console 400 interacts with the Storage Unit 358 to retrieve context-based events regarding previously recorded multi-media programs.

Depending upon the mode of operation, the Intelligent Console 400 automatically changes its display features (described below). In live modes of operation, the Intelligent Console 400 automatically displays alarms that can be implemented by a user. These alarms notify the user when context-based events of interest occur during multi-media programs. For example, in an exemplary embodiment for use with a basketball tournament, a user can display a "live" basketball game and implement alarms for other live basketball games of interest. These alarms can alert the user when a game begins, ends, is within a chosen point differential, has five minutes before expiration, and so on.

In archive modes of operation, the Intelligent Console 400 displays information regarding an entire multi-media program together with an indicator showing the time that the multi-media program is currently being displayed. The Intelligent Console 400 can display context-based events and/or time-referenced events of a multi-media program that are of interest to a user together with their corresponding and associated time-referenced data. For example, a user can navigate to a specific time (i.e., a time-referenced event) during a game (i.e., a multi-media program) and display audio, video, data graphs, statistical graphs, etc. (i.e., the corresponding and associated time-referenced data). Similarly in another example, a user can navigate to an instant during a game (multi-media program) when the score was tied (i.e., a context-based event) and display audio, video, data graphs, statistical graphs, etc. (corresponding and associated time-referenced data). Thus, the archive mode of operation provides a powerful and flexible method for displaying and accessing context-based and time-referenced events of a multi-media program.

The Intelligent Console 400 can operate in live mode only, archive mode only or both modes simultaneously. In an example of operation in both modes simultaneously, the Intelligent Console 400 operates in live mode by monitoring a "live" multi-media program and by notifying a user when an event of interest occurs within the multi-media program. The intelligent console 400 can simultaneously display previously recorded multi-media programs and context-based information regarding events of interest that occurred during the previously recorded multi-media programs. As stated above, the user typically interacts with and accesses the logical database process 320 using the Query Process 326. The Query Process 326 is now described.

Query Process

Those skilled in the multi-media programming arts will appreciate that not every portion of a set of multi-media programs is significant or important to an end user. Typically, the end user is only interested in a small portion of the multiple multi-media programs such as certain statistical data and their associated multi-media data. For example, an end user may be interested in four basketball games, their scores, and their audio data at certain times of the game. Due to the tremendous volume of statistical and multi-media data that is generated by a typical multi-media program (it is well known that digitized video data alone requires massive data processing and storage capability) a data filtering function is both desirable and required. This filtering function helps eliminate or "strip-away" multi-media data (largely video and audio information) that is relatively unimportant to the end user. Therefore, the Query process 326 is provided in the preferred embodiment of the multi-media system 300 of FIG. 4*a* to assist the Intelligent Console process 400 of the present invention.

As shown in FIG. 4*a*, the Query process 326 interacts with the Intelligent Console Client process 302 and the Statistical Database process 322 to provide selected multi-media data to the user 308. The user 308 interfaces with the Intelligent Console Client process 302 to input criteria and conditions for perceiving a multiple multi-media program of interest. Thus, the Query process 326 filters large amounts of data from the multiple Multi-Media Programs 340*a*-340*n*. The Query process 326 constantly searches the Statistical Database 322 for multi-media events that satisfy conditions input by the user 308 via the Intelligent Console Client process 302. The Query process 326 periodically sends data updates to the Intelligent Console Client process 302 when the Query process 326 detects multi-media events that satisfy the user queries. This update may comprise statistical data, other data, an alert or a combination of all. In the preferred embodiment the updated data helps to coordinate the Intelligent Console Client process 302 with the Media Player process 304. The Media Player process 304 interacts with the Multi-Media Data process 324 to play the multi-media data of interest.

Intelligent Console

As shown in FIG. 4*a*, the Intelligent Console 400 of the present invention preferably comprises a Media Player process 304 and an Intelligent Console Client process 302. In the preferred embodiment, the Intelligent Console process 400 comprises computer software executing on a standard desktop personal computer. Alternatively, the Intelligent Console 400 comprises computer software executed via a cable box or satellite dish system. The Intelligent Console 400 assists in building the fully synchronized Multi-Media Database 324 as described above based upon the audio, video, statistical data and other data that are input to the Logical Database process 320. The Intelligent Console 400 displays only selected data contained in the Multi-Media Database 324 based upon the filtering criteria and other inputs provided by a system user via the system user interface 310-314. The selected data is preferably accessed from a desktop computer via the Internet (or via an Intranet). Alternatively, the selected data can be stored on any storage medium known to one of ordinary skill in the art such as CD-ROM, ZIP disk, and portable hard drive. In the preferred embodiment, a high-speed connection can be used to transfer the selected data to the Intelligent Console 400. An exemplary high-speed connection comprises the well-known 100 BaseT Ethernet® communications link. However, other high-speed links can be used.

Media Player Process

As described above, the Intelligent Console 400 preferably includes the Media Player process 304. Media players are well known to those of ordinary skill in the art and therefore are only briefly described herein. A media player is a method or technique for accessing a multi-media database and for playing selected data. Typical multi-media data includes video, static video images, audio, and closed-captioned text. An example of a media player is the well-known Microsoft Media Player™ which accesses a memory device (e.g., a hard drive) to play selected audio or video files. The present invention preferably uses a media player that is capable of accessing multi-media data stored on the Internet (or Intranet) using streaming technology. Streaming technology allows multi-media data to be played in real-time with only a short time delay (e.g., 15 seconds). Media players that use streaming technology to access the Internet are well known and examples of such include the well-known Realplayer™ and Netshow™. In one preferred embodiment, the media player of the present invention is displayed on a television connected to a cable box or a satellite decoder box. In another preferred embodiment, the media player comprises a television connected to a DVD player or VCR.

As shown in FIG. 4*a*, in the preferred embodiment, the Media Player process 304 communicates with the Multi-Media Database 324 (via the present Intelligent Console invention 400) over the Internet (in other embodiments, the database 324 is accessible via an intranet). In this embodiment, the Media Player 304 communicates with both a real audio server and an Internet world-wide web server located within the Logical Database 320. An Internet Service Provider (ISP) preferably maintains both the real audio server and the web server. As described below in more detail with reference to the inventive intelligent console method and apparatus, the real audio server downloads audio clips to the Media Player 304 in response to user queries. The web server provides all other information including instructions for building and maintaining a web page, event/query information, and real audio URL information. As described below in more detail, in one embodiment, the inventive console executes on a user's computer (e.g., a desktop computer 314 located at the user's home or business). In this embodiment, the user 308 launches an intelligent console installer program that installs the inventive Intelligent Console process 400 on the user's computer 314 and registers with both the web server and the real audio server. The details related to the implementation and operation of the present invention are described below with reference to FIGS. 5-6.

As described above, multi-media data can be broadcast and stored via the Internet in real-time. In the preferred embodiment the present invention receives multi-media data from a multi-media database via the Internet. However, the present invention can alternatively receive multi-media data from other sources such as the multi-media database via an Intranet, satellite link communication systems and cable communication systems. Examples of companies that provide real-time multi-media databases via the Internet include ESPN.com™, InterVU.net™, and Broadcast.com™. In an exemplary embodiment, the present invention receives real-time audio data from live multi-media programs or recorded programs. As described below, the Media Player process 304 of the exemplary embodiment preferably accesses the Multi-Media Database 324 via Realplayer™.

In the preferred embodiment, the Media Player 304 plays only audio data. However, in another preferred embodiment, the Media Player 304 plays audio, video, and closed-captioned text data. In this embodiment, the amount of video data that can be played by the Media Player 304 depends upon the data rates at which the video server transmits video clips to the Media Player 304. Thus, a video window of the Media Player 304 may vary in size and video refresh rates. For example, in one embodiment using a video transmission rate of 28.8 kilobits/sec, the video window is 160×120 pixels in dimension and has a video refresh rate of 6 frames per second. In an alternative embodiment, using a video transmission rate of 56 kilobits/sec, the video window is 320×240 pixels in dimension and has a video refresh rate of 6 frames per second. The video clips stored in the system database are preferably encoded using a well-known video encoding and compression method. For example, in one embodiment, the video clips are encoded using the encoding method used by Real Video®.

Intelligent Console Client Process

The Intelligent Console Client process 302 allows a user to interface with the Statistical Database 322 via the query process in selecting multi-media data of interest. Typically, users will want to view only selected data from a set of multi-media programs such as the scores of sporting events and certain other statistical data. Thus, the Intelligent Console process 302 sends a set of filters to the Query process 326 that represent events and data that is of interest to the user 308. In the preferred embodiment of the interactive multi-media system 300, the inventive Intelligent Console process 302 is implemented by software executed on a computer workstation. In this embodiment, a system user interacts with the system 300 and interacts with the Intelligent Console process 302 to select specific conditions or criteria for receiving data from particular multi-media events. For example, the user 308 may interact with the Intelligent Console process 302 to select specific scoring plays of a basketball game.

A wide variety of filtering criteria can be provided depending upon the multi-media programming. For example, in one preferred embodiment, the Intelligent Console process 302 includes a "personality module" (not shown in FIG. 4*a*) that is specific to a multi-media program to be processed by the system 300. The personality module is specifically designed to provide the Intelligent Console process 302 with pre-determined and pre-defined knowledge concerning the multi-media program processed by the system 300. The pre-determined knowledge aids the Intelligent Console process 302 in obtaining information from a multi-media database that is indexed by (in addition to other indices) context-related programming events. For example, in one embodiment, the personality module comprises a "basketball" utility. In this case, the personality module comprises a utility process that can identify key events such as turnovers (i.e., sudden change of possession from one team to an opposing team), 3-point shots, etc. Alternatively, the module may provide knowledge relating to football, tennis, and other media events. The Intelligent Console process 302 uses the personality modules to further define, filter and interpret the statistical, sensory, filter criteria and other data provided as inputs to the system. The Intelligent Console process 302 thereby automatically assimilates and synchronizes these diverse data types to create a powerful yet very flexible multi-media database indexed by multiple context-related multi-media events. The Intelligent Console process 302 interacts with the Query process 326 to provide periodic updates of statistical data of interest to the user.

In the preferred embodiment, the Intelligent Console process 302 presents a standard set of statistical data for the programs of interest. After viewing the data, a user can choose events of interest from the statistical data by interacting with the Intelligent Console process 302. For live events, the Intelligent Console process 302 periodically updates the statistical data for these events. For recorded events, the Intelligent Console process 302 presents the statistical data for the entire event. Some of the statistical data is time-referenced and the user 308 can choose to perceive a time-referenced statistical event of interest by simply clicking on the time-referenced statistical data corresponding to the time of interest.

In an exemplary embodiment of the present invention, the Logical Database 320 comprises two separate databases, the Multi-Media Database 324 and the Statistical Database 322, residing on separate servers. Both the Multi-Media Database 324 and the Statistical Database 322 are accessible via the Internet (or Intranet) in a well-known manner. In the exemplary embodiment, the Multi-Media Database 324 comprises real-time audio data that resides on a Broadcast.com™ server. Alternatively, another server such as InterVU.net™ can be used to implement the Multi-Media Database. Methods of transferring voice to data and accessing the audio data on the Internet are well known.

An embedded audio player within the Media Player 304 interacts with the multi-media database 324. In the exemplary embodiment, the database 324 resides on a Broadcast.com™ server. The Broadcast.com™ server streams audio data via the Internet to the RealPlayer™ in a well-known manner. Thus, the audio commentary from a live event occurs in real-time with only a short time delay.

In the exemplary embodiment, the Statistical Database 322 resides on an Internet server. A statistician viewing a live satellite feed of a program feeds data into the database. The Statistical Database 322 is constantly updated during the live program. The Query process 326 accesses the Statistical Database 322 for statistical data of interest to the user 308. The statistical events of interest may comprise scores of basketball games, point differentials, action, momentum, and player statistics.

In the exemplary embodiment, the inventive intelligent console executes on a user's computer (e.g., a desktop computer 314 located at the user's home or business). In this embodiment, the user launches an intelligent console installer program that installs the inventive console on the user's computer. In the exemplary embodiment, the installer program is launched from a 10 server such as the Broadcast.com web site. The server sends a program via the Internet to the user's desktop computer in a well-known manner. Alternatively, the program may be downloaded previously from the Internet or a CD-ROM and launched from the user's computer. In one embodiment, the intelligent console program comprises an applet comprising JAVA code. JAVA code is well known in the Internet software art and therefore is not described in more detail herein. Applet's are also well known in the Internet software art, and comprise an interface program between the computer and a server. As used herein, the term "machine-readable medium" is a term commonly known to persons of ordinary skill in the art, referring to a medium capable of storing data in a machine-readable format that can be accessed by an automated sensing device and capable of being turned into some form of binary. Examples of machine-readable media include (a) optical storage (e.g., CD-ROM, Blu-ray, and the like,) (b) magnetic storage (e.g., magnetic disks and tapes), (c) electrical storage (e.g., Read only memory, floating-gate transistor used in non-volatile memory, commonly known as flash memory, etcetera).

In one embodiment, the present console executes on a computer that is co-located with the interactive multi-media system described above with reference to FIGS. 3 and 4*a*. However, in the embodiment presently contemplated by the inventors, the Intelligent Console 400 is first installed and subsequently executed by the user's computer (typically a personal computer). Using the present console, the user gains access to the multi-media system via the well-known world-wide web (or Internet). Alternative communication networks, such as Intranets, may be used without departing from the scope of the present invention.

Figure 5A:
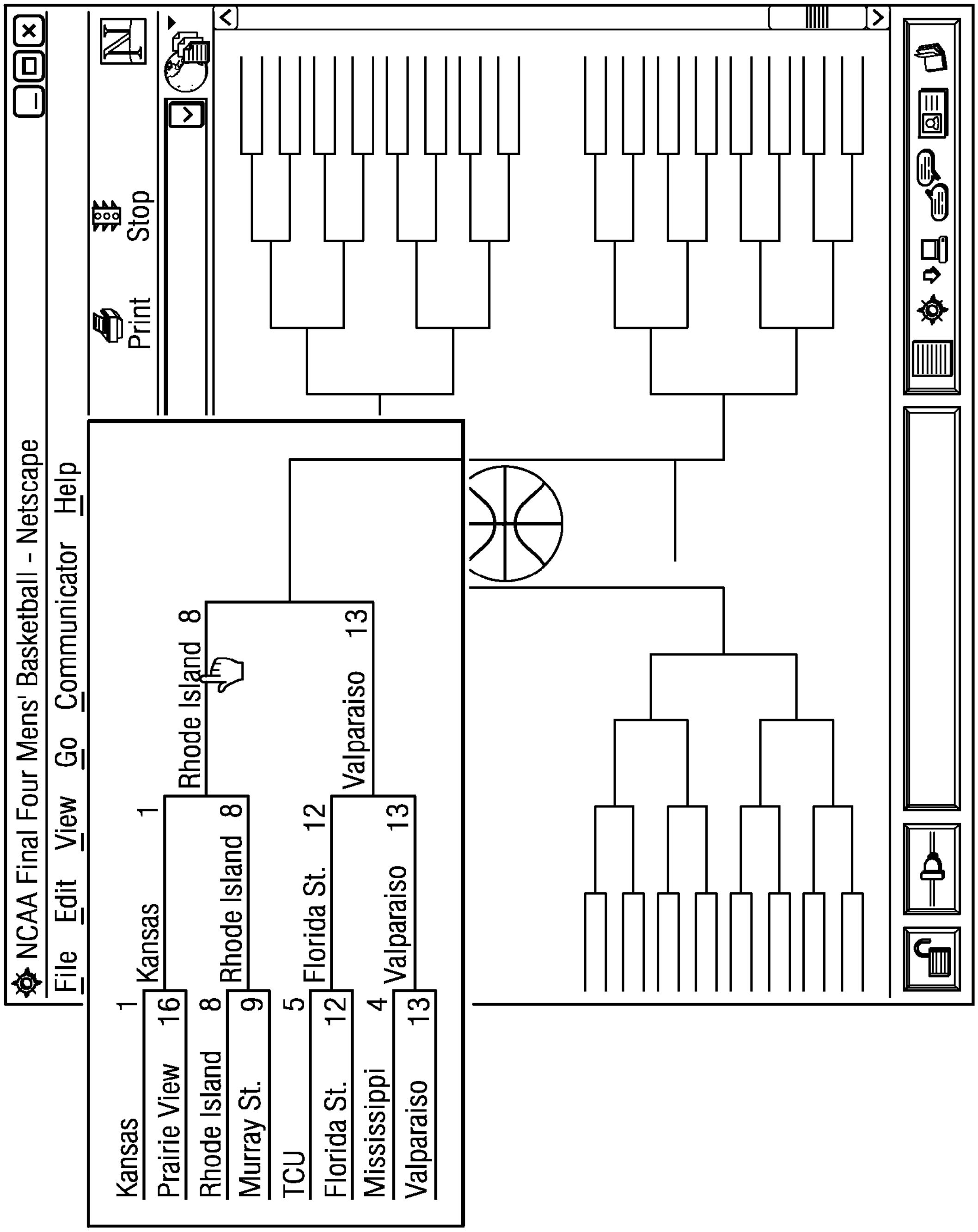
FIG. 5*a* shows an initial display of an exemplary embodiment of the intelligent console method and apparatus of the present invention.

To use the present inventive console, the user first accesses the web server and views an initial web page. FIG. 5*a* shows an exemplary web page that would be displayed to the user 308 on the display 310. In this example, the initial web page (transmitted in the well-known HTML format) lists all tournament basketball games. After the user chooses a game or round of interest (by pointing and clicking on a web link), the computer downloads an installation program that installs the present intelligent console process on the user's computer 314. Also, the program registers the user's computer with of the web browsers that are launched by the console. The console preferably comprises a "helper" application.

Figure 5B:
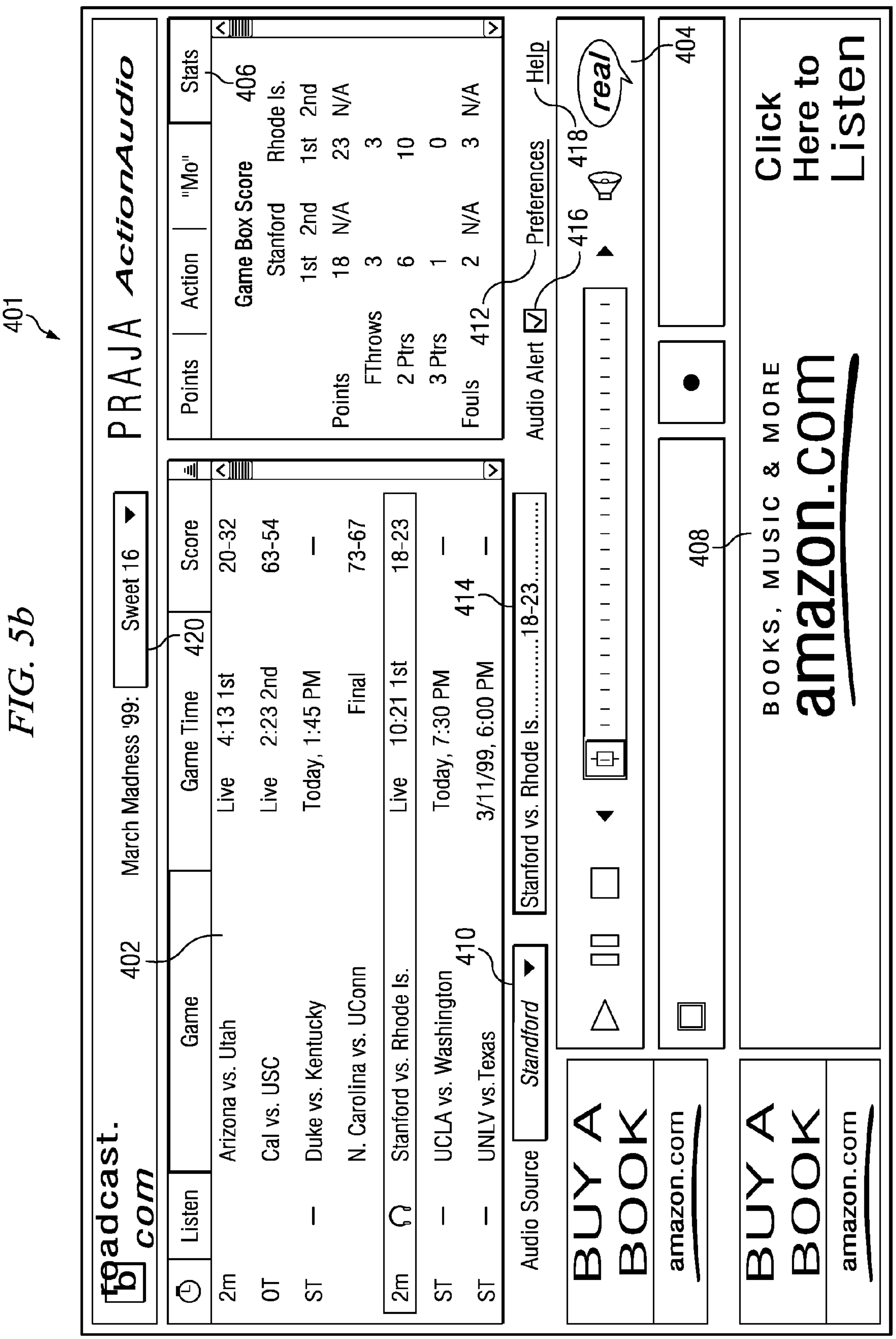
FIG. 5*b* shows a display generated by an exemplary embodiment of the intelligent console method and apparatus of the present invention.

As shown in FIG. 5*b*, after the Intelligent Console 400 is started on the user's computer 314, the web server downloads a set of data to the user's computer. Using the inventive intelligent console process 400, the user generates a query. The query is communicated to the Query process 326, which, in turn, accesses the Multi-Media Database 324. The results of the query are transmitted to the Media Player 304 via the Internet. The results of the query (shown in FIG. 5 as screen display 401) are displayed by the intelligent console on the display 310. In one embodiment, a graph/timeline is created in response to the query that graphically depicts the query results. The user then can select and play events represented by a timeline as shown in FIGS. 6*c*-6*e*. Audio clips corresponding to the selected times (or other selected event) are fetched from the audio server and transmitted to the audio player for subsequent playback.

Graph/Timeline Display and Indexing

The present Intelligent Console invention provides a number of innovative and useful features and functions that were heretofore unavailable to users of interactive multi-media systems. One important aspect of the inventive console process 400 is its ability to interact with a multi-media database in an intuitive manner whereby multiple multi-media objects and events are linked together on a graphical timeline for subsequent accessing by the user. As described above with reference to the description of the logical database 320 (FIG. 4*a*), significant multi-media objects and events are preferably stored in the relational object-oriented multi-media database 324. The multiple data types associated with a selected object/event are synchronized by the system 300 and thereby linked together within the database 324. For example, a particular video clip, audio feed, associated text and other statistical information relating to the audio clip are synchronized and linked together within the multi-media database 324. All of the multi-media data types associated with a particular event can be linked together using a graphical timeline. As an indexing and linking mechanism, the timeline provides a powerful, intuitive, and flexible means for interacting with the multi-media system. As shown in FIGS. 6*c*-6*e*, a timeline 422 of an exemplary display is represented by the x-axis on the graphs.

The x-axis timeline comprises a means for graphically displaying the contents of the multi-media database to the user. More specifically, the timeline is a representation of the environment previously captured, filtered, modeled and stored in the Multi-Media Database 324. The display of the timeline will vary based upon the specific queries entered by the user and based upon the contents of the multi-media events stored in the database. For example, in the basketball example, the timeline may graphically represent the point differential of the entire game. Alternatively, other statistical data such as momentum (decided by a formula comprising game statistics) can be graphically represented on the timeline. The user can use the timeline to display an entire multimedia program, or alternatively, only a selected portion of the program. Thus, the timeline can function as a global representation of the entire multi-media program, or of a portion thereof. Once the timeline is generated, any selected event can be displayed (e.g., a portion of audio can be played by the Media Player 304) by simply positioning a cursor over the representation of the event on the timeline 422 and clicking the mouse. The timeline 422 therefore provides a link to every data type associated with the represented event.

The timeline 422 is used by the intelligent console to graphically summarize the results of a user query. For example, suppose a user wants to view all of the important events (e.g., turnovers) relating to player X. In response to such a query, the timeline would graphically display all of the events that meet this query. The timeline provides temporal information related to the events (i.e., when did the event occur during the game).

Once the timeline is displayed to the user, the user need only select the graphical representation of the event of interest and all of the windows in the display 401 are updated with the appropriate information. For example, assume that the timeline displays all of the points scored during a particular basketball game. By selecting a particular time on the timeline, the audio player plays the previously digitized and stored audio clip of the selected point scoring. In addition, the play-by-play text and statistical information associated with the point scoring will also be played. As described above, all of these data types are linked together by the system and displayed in response to a user query.

Intelligent Console—an Exemplary Application—NCAA Basketball Tournament

The Intelligent Console 400 of the present invention is now described with reference to a specific application—The NCAA Men's Division 1 basketball tournament, otherwise known as "March Madness". FIG. 5*b* shows a typical screen display 401 generated by the present inventive intelligent console method and apparatus 400 of FIG. 4*a*. The Intelligent Console 400 preferably outputs the screen display 401 of FIG. 5*b* on a user's monitor such as the user display 310 of FIG. 4*a*. The screen display 401 preferably comprises a plurality of multi-media information viewing areas or windows. The user 308 selects games and events of interest via a user interface to the Intelligent Console 400. In the exemplary embodiment, the user interface comprises both a "schedule" window and a "preferences" window. These windows are preferably displayed to the user 308 on the Display 310. The schedule and preferences windows are described in more detail below with reference to FIGS. 5 and 6. A description of each information viewing area is set forth below in more detail.

In the exemplary embodiment, the Intelligent Console process 400 essentially contains two data types: audio clips and Internet "web" page information. The world-wide web page information includes the following: information relating to the web page layout (preferably written in the well-known HTML format); graphs, advertisements, etc.; and a query data file containing all possible queries available to a user 308. This information is provided as output from the Logical Database process 320 and Query process 326 to the Intelligent Console process 400 of the present invention. The Media Player 304 of the Intelligent Console 400 in the exemplary embodiment comprises an embedded audio player such as RealPlayer™ to play audio data of interest. The Intelligent Console Client 302 of the Intelligent Console 400 in the exemplary embodiment comprises information and viewing windows to display data of interest to the user.

To launch the intelligent console, a user logs on to the web site and chooses a team or round of interest. FIG. 5*a* depicts an exemplary screen display of a web site depicting choices for a 64-team basketball tournament bracket. After the intelligent console is launched, display window 401 appears on the user's monitor 310.

In the exemplary embodiment, the screen display 401 preferably comprises a 320 by 240 pixel display window. However, this window can be optionally re-sized by the user to any convenient viewing dimension. As shown in FIG. 5*b*, the screen display 401 preferably optionally includes a "plug-in" audio media player 404. The audio media player 404 interacts with the Multi-Media Database 324. It is preferably provided as an optional feature and can be replaced by another window displaying well-known applications such as spreadsheet, word processor, or presentation applications. In addition, the audio media player 404 can be replaced with another display window capable of displaying advertisement information.

The screen display 401 preferably includes a plurality of control buttons to allow a user (e.g., the user 308 of FIG. 4*a*) to interact with the Console 400. The selection of control buttons by a user will cause the intelligent console to change various aspects of the screen display 401. The user typically selects these buttons using a convenient user input selection device such as the mouse 312 shown in FIG. 4*a*. For example, when a mouse is used, the user simply "points and clicks" the mouse in a well-known manner to select a desired control button on the screen display 401. Alternatively, other well-known user input means can also be used to select the control buttons. The control buttons provide the user a convenient means for instructing the intelligent console 400 to change the appearance of the screen display 401. For example, one control button 420 can be used to "pull-down" a list of tournament rounds and the user 308 can select a round of interest to be displayed. Other user control buttons are included that: provide user "help"; generate a "preferences pop-up" window; display selected statistics; play audio; change audio source; and sound audio alerts.

As shown in FIG. 5*b*, the screen display 401 output by the intelligent console 400 preferably includes a schedule window 402, an embedded audio player 404, a graph/data window 406, and an advertisement window 408. Those skilled in the computer user interface arts will recognize that the specific arrangement of the windows (402-408) shown in FIG. 5*b* are exemplary only and can vary in size and position without departing from the scope of the present intelligent console invention. For example, the schedule window 402 can be smaller, larger, or be positioned elsewhere within the display 401 (e.g., positioned where the graph/data window 406 is shown). In addition, the display 401 preferably uses a wide variety of colors, fonts, passive and active (e.g., blinking on and off) indicators to aid the user in accessing information stored in the Logical Database 320. The particular arrangement and description of the colors, fonts and passive/active indicators presented herein are exemplary only, and should not be interpreted as limiting the scope of the present intelligent console invention. Each of the viewing areas or windows is now described in more detail.

Schedule Window

The Inventive Console 400 uses the Schedule Window 402 to display information that is responsive to selected conditions input by a user. Referring to FIG. 5*b*, the schedule window 402 displays the programs of interests (i.e., basketball games) to the user 308. The programs of interest can be selected from a pull-down menu or preferences window. The Schedule Window 402 has a set of buttons that are associated with columns of information under the buttons. In the exemplary embodiment the Schedule Window 402 comprises five buttons/columns: Game Status (begin, first half, second half, 2 minute warning, overtime), Audio Status, Game Teams (e.g., Arizona vs. Utah), Game Time, and Score. These buttons can be used to vary the order of the information presented in the window. For example, alphabet, score, status, or the time of tip-off/begin can order the games. One of ordinary skill in the art will recognize that these buttons and information are only exemplary and other statistical data can be used to order and display the multi-media programs of interest. The Schedule Window 402 provides information updates on the games of interest. In one embodiment, the Schedule Window 402 is updated every twelve seconds.

The Schedule Window 402 is updated through the Query process 326. The Query process 326 obtains statistical data of interest from the user 308 and outputs the appropriate data to the Schedule Window 402. Game times, game status, and scores are updated every twelve seconds in a live real-time basketball game. For a pre-recorded game, the window displays "Final" in the Game Time column and the final score in the Score column. Also, the winner of the basketball game is highlighted in bold lettering in the Game Team column. The schedule window 402 allows a user to switch between listening to basketball games of interest. As such, the window 402 displays the basketball game currently being played by the embedded audio player. In one embodiment, the window 402 displays a headphone icon next to the game presently being broadcast, and underneath the "listen" column.

Embedded Audio Player

As shown in FIG. 5*b*, the screen display 401 generated by the Intelligent Console 400 preferably includes an area for playing multi-media data. In the exemplary embodiment, the multi-media data is played from an embedded audio player 404 known as RealPlayer™. Other audio players can be used such as Netshow™. Methods and techniques of embedding an audio or other media player in HTML code are well known in the art. The embedded audio player 404 may include various controls for play, pause, stop, and volume. These controls are only basic controls and one of ordinary skill in the art will recognize that other controls may be used without departing from the spirit of the present invention.

Referring again to FIG. 5*b*, the screen display 401 also includes a means for controlling the audio media player window 404 display (and other displays) using context-sensitive audio controls. First, standard "play", "stop", "pause", "reverse", and "forward" controls are provided. These controls are similar to analogous controls that are available on standard audio players, and they function similarly to control the play of audio clips. In an alternative embodiment, the audio controls may also function to allow the user to fast forward (or reverse) between multi-media "events" that are sequenced on a global system timeline within the system database. For example, in the basketball example described above, the user may move forward to an important time that occurred subsequent to the current time simply by pressing an audio control button. Alternatively, a user may click and hold down a slide button to drag the button to the desired time of interest during a game. Examples of other control buttons include a "fast forward two times" button and a "go to next game" button.

The capability of moving within and between multi-media events is also described below with reference to the description of the graph/data window 406. Using context-based linking capabilities, the present intelligent console allows users to move forward (or backward) between multi-media events, objects, players, topics, etc. that are linked together in the database 320 that is created and maintained by the interactive multi-media system described above.

The embedded audio player 404 can be controlled via the control buttons described above or through the applet. The applet provides user interface windows such as schedule window 402 and graph/data window 406 to display statistical data. These windows 402, 406 allow a user 308 to change the stream of data played by the audio player. For example, a user 308 can change the current audio broadcast from the Stanford game to the Arizona game by simply clicking the Arizona game in the schedule window 402. Also, for recorded games, the user 308 can access any time-referenced point of a game from the graph/data window 406. As described below, the graph/data window displays statistical data in time-referenced graphical form. The user 308 can click on a time of interest on the graph and the audio player will access the audio data at the time of interest from the Multi-Media Database 320. This provides an enormously flexible tool to quickly identify times of interest during a game and to easily access the multi-mediadata associated with the identified time of interest.

Graph/Data Window

The screen display 401 of the present invention preferably generates a graph/data window 406 that displays statistics and other data associated with the event selected in the schedule window 402. The graph/timeline display and indexing features described above are accessed using the graph/data window 406. In the basketball game example the statistical data can include information about a player, a team, the free-throw percentage of a player, turnovers, etc. In the exemplary embodiment, the statistical data is displayed in a variety of time-referenced graphical forms where the x-axis represents the game time in two-minute intervals. The two-minute intervals or bins are exemplary only and one of ordinary skill in the art will recognize that other time intervals are possible.

The preferred embodiment of the present invention includes a statistical database 322 that provides statistical information to be viewed in the graph/data window 406. Some of the statistical data are time-referenced to associated multi-media data. This time referencing allows for simple coordination between the statistical information and the multi-media data. The graph/data window 406 can display four different information displays: points, action, momentum, and statistics. In the exemplary embodiment, three of the displays (points, action, and momentum) depict statistical graphs with the game time referenced on the x-axis for coordination with the embedded audio player 404 (FIG. 5*b*). The fourth display (the statistics display) only represents certain game statistics in numerical form. Thus, the statistics display cannot coordinate with the multi-media data.

In the exemplary embodiment, the graph/data window 406 comprises four buttons and a display area. As shown in FIG. 6*b*, for example, selecting one button (by pointing and clicking) causes the display of statistical data associated with that button. Referring to FIG. 6*b*, the "Stats" button is selected and a simple box score of the game is displayed in the window 406. The box score is broken up into the two halves of the game. The following are the game statistics listed in the Stats window: points, free throws, 2 pts, 3 pts, fouls, assists, steals, and rebounds. The other three buttons on the graph/data window 406 display statistical data in graphical form.

Referring to FIGS. 6*c*-6*e*, the three graphical displays provide an intuitive interface for a user 308 to access the multimedia data of interest based on the statistical data presented. For example, suppose a user views the points graph in the graph/data window 406 and is interested in listening to a part of the game where the "action" favors the home team. Referring to FIG. 6*c*, the user simply clicks on the statistical graph at the point of interest and the media player automatically plays the audio data corresponding to that point. The three graphical displays are now described in more detail.

As shown in FIG. 6*c*, the "action" meter is a visual representation of a team or individual player's activity during a game. "Activity", in this example, is defined as a team's or player's contribution to the scoring, rebounding, assisting, or stealing during the game. In general these attributes are positive. In an alternative exemplary embodiment, the action meter also includes a negative activity meter, which means that a player negatively contributed throughout the course of the game (did a player: have the ball stolen, commit a foul, etc.). In the exemplary embodiment, the game is divided into 20-two minute bins. The value of each bin is determined as shown in table 2.

TABLE 2

| Team or Player Bin Scoring System | |
|---|---|
| Scored a 3 pt | 3 pts |
| Scored a 2 pt FG | 2 pts |
| Scored 1 pt FT | 1 pts |
| Rebound | 1 pts |
| Assists (player only) | 1 pts |
| Steals | 1 pts |

Referring to FIG. 6*c*, a user can choose between two basic comparisons: Team Comparison and Player Comparisons. The team comparison graph is labeled as "game". The game graph will show the activity comparison between the two teams. The other mode, Player Comparisons, allows a user to choose a player from the team A pull down menu and someone from the team B menu. The top 3 performing players from each team can be selected from the player pull down menus shown at the top of FIG. 6*c*. Picking the top 3 players is performed on the statistical database server side. The server will have a roster of all the players for both teams. As the players contribute to the game, the points described in table 2 will be accumulated into the respective player's bin. Similar to the point difference graph described below, a player's bin is divided into 20-two minute bins. The selection of the top 3 players is performed by summing all 20 bins for each player. The top 3 players with the most points are selected from each team.

As shown in FIG. 6*d*, a "points" or "point difference" graph can be accessed to show the relative score between the two teams. In the exemplary embodiment, the game is divided into 20-"two minute" bins. The bin value of two minutes is exemplary only and can be varied. Equation 1 shows the formula for calculating the values for the bins.

$$\text{Point Difference graph (PDG)=Team } A \text{ Score}-\text{Team } B \text{ Score} \quad \text{(Equation 1)}$$

Thus, within a bin (block of two minutes), the value of the graph is the relative score. If the value is positive, then team A is leading the score. If the value is equal to zero, then the game is tied. If the value is negative, then team B is leading.

As shown in FIG. 6*e*, a "mo" or "momentum" meter measures the scoring momentum of each team. Momentum is defined as the score distribution throughout the duration of the game. The graph uses 20-"two minute" bins. The mo-meter is a subset of the team action meter in the sense that only scoring plays contribute to the weights of each bin. Referring to FIG. 6*e*, the mo-meter shows a graph of the momentum of both teams overlaid on each other.

As noted above, the four graph/data displays described are exemplary only and as one of oridnary skill in the art will recognize, other graph/data displays can be used based upon other statistical data.

Advertisement Window

The Inventive Console 400 uses the Advertisement Window 408 to display context-based advertisements ("ads") that are responsive to conditions selected by a system operator (i.e., a person that manages the interactive multi-media system 300). In a preferred embodiment, ads are generated when a selected condition relates to a context-based event. For example, an ad for merchandise of a particular team is generated when the lead changes in favor of the particular team. In another example, an ad for merchandise for a particular player is generated when the particular player scores points. The context-based generation of ads provides the inventive interactive multi-media system 300 with a powerful marketing tool.

Miscellaneous Controls and Windows

Referring again to FIG. 5*b*, menu and control display areas 410, 412, 414, 416, and 418 provide various options or information to the user 308. An Audio Source pull-down menu 410 is provided to allow the user 308 to activate a selected event by pointing a cursor over the event and clicking a user input device such as a mouse. In the exemplary embodiment, the menu 410 controls the audio source to be played by the audio player. Typically, the user 308 can choose between a home team audio commentary, an away team audio commentary or a national audio commentary. When the user activates a selected audio commentary, the audio player plays the streaming audio data associated with the selection. A Preferences Window link 412 opens up a preferences window.

As shown in FIG. 5*b*, the screen display 401 of the exemplary embodiment includes a preferences link button 412 that allows a user to open the preferences window 430 (using a point and click method). In one preferred embodiment of the present console, the preferences window 430 includes a plurality of "check-box" buttons. Each button has an associated statistical data item and program of interest that can be queried. As described above, the user accesses the preferences window 430 to query the multi-media system (and thereby request display of a particular item of interest). For example, suppose a user wants to display information on a specific game and be alerted when the game has two minutes remaining.

Figure 6A:
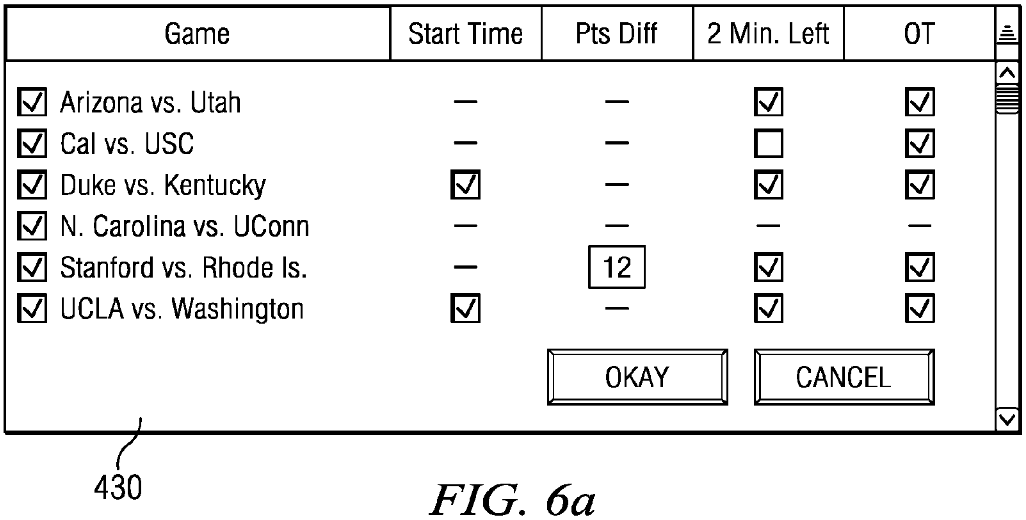
FIG. 6*a* shows a preference window of an exemplary embodiment of the intelligent console method and apparatus of the present invention.
Figure 6B:
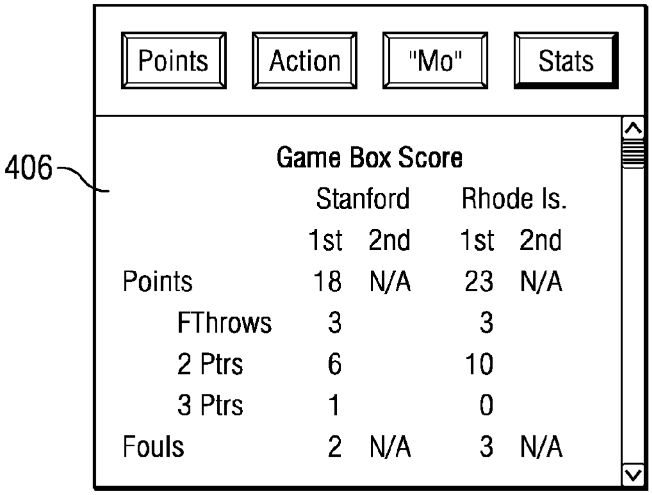
FIG. 6*b* shows a statistics mode of the graph/data window of an exemplary embodiment of the intelligent console method and apparatus of the present invention.
Figure 6C:
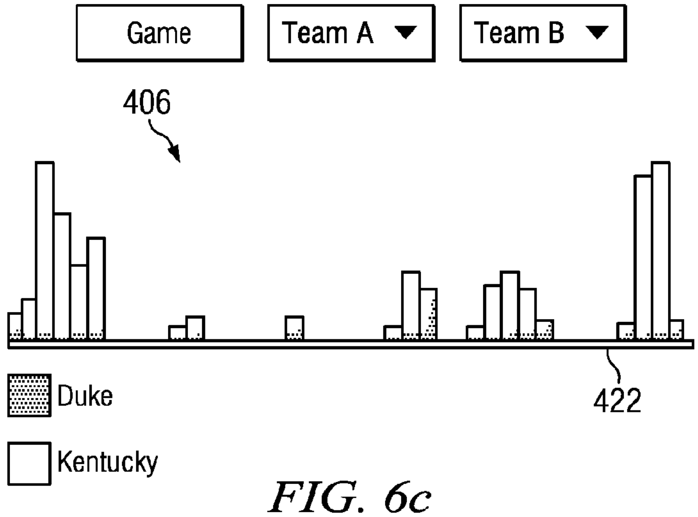
FIG. 6*c* shows an action mode of the graph/data window of an exemplary embodiment of the intelligent console method and apparatus of the present invention.
Figure 6D:
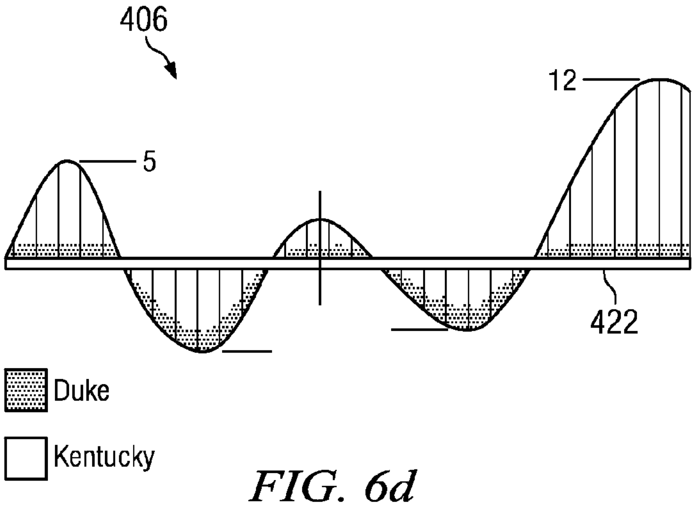
FIG. 6*d* shows a points mode of the graph/data window of an exemplary embodiment of the intelligent console method and apparatus of the present invention.
Figure 6E:
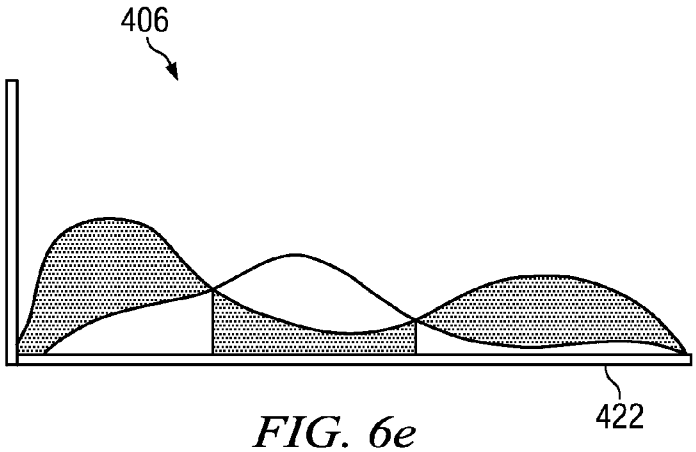
FIG. 6*e* shows a momentum mode of the graph/data window of an exemplary embodiment of the intelligent console method and apparatus of the present invention.

Referring to FIG. 6*a*, the user would simply point and click on the "check-box" button for the game of interest (e.g., Arizona vs. Utah) and the button horizontally across from the game and vertically under the 2-Min. left column. These preferences directly determine the type of statistical and program data that appears on the Intelligent Console. Checking the boxes in the columns produces the following results. The first column, labeled "Game", selects which games the user wishes to monitor. The "Start Time" column alerts the user when the game is about to begin. The "Pts Diff" column allows the user to input an integer value between 0-99. If the point difference between the two teams is less than this value, an alert will pop up. The "2 Min. Left" column alerts the user when the game is about to enter the last two minutes of the game. Similarly, the "OT" column alerts the user if the game has entered overtime.

A Ticker Window 414 provides current game summary or play-by-plays for the currently selected game. The Ticker Window 414 also provides help messages for buttons selected by the point and click mouse. An Audio Alert button 416 allows a user to selectively be alerted by a sound when a user query condition is satisfied. When the audio alert button 416 is selected to be active or on, an audio alert is played. A Help button 418 is provided which, when selected, launches an external help web page in a manner well-known in the art.

Summary

In summary, the present invention is a novel method and apparatus for interacting and displaying multiple multi-media programs. The intelligent console method and apparatus of the present invention includes a powerful, intuitive, yet highly flexible means for accessing a multi-media system having multiple multi-media data types. The present intelligent console provides an interactive display of linked multi-media events based on a user's personal taste. The intelligent console includes a graph/data display that can provide several graphical representations of the events satisfying user queries. The user can access an event simply by selecting the time of interest on a timeline of a graph/data display. Because the system links together all of the multi-media data types associated with a selected event, the intelligent console synchronizes and displays the multiple media data when a user selects the event. Complex queries can be made using the present intelligent console. The user is alerted to the events satisfying the complex queries and if the user chooses, the corresponding and associated multi-media data is displayed.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A system for presenting data on a user's computer or other physical device that executes an interactive console for user interactions, the data being associated with defined context-based events, wherein the data is retrieved from at least one database based upon receiving an event-selection criterion from the user's computer or other physical device that executes the interactive console, the system including:

the at least one database to store the data associated with defined context-based events, the data being captured and stored in the at least one database as the context-based events occur, and the data being stored in various media formats;

a query generator to generate a standing query, the standing query including at least one condition that is based on the event-selection criterion received from a user, the query generator in communication with the at least one database;

a query processing unit to process the query and identify the data that is associated with the at least one condition of the standing query, the query processing unit in communication with the query generator and the at least one database, wherein the interactive console is in communication with the query processing unit and the at least one database and receive the event-selection criterion from the user and display a list of context-based events associated with the data that satisfies the at least one condition of the standing query; and a media player for each media format in the at least one database, each media player associated with a particular media format and operable to present the data associated with the defined context-based events in the particular media format via the interactive console, wherein each media player comprises a portion of the interactive console.

2. The system of claim 1, wherein the query processing unit is operable to modify the at least one condition of the standing query based on an additional event-selection criterion received from the user via the interactive console, and the interactive console is operable to automatically and dynamically update the list of context-based events displayed to the user based on the data that satisfies the at least one user-modified condition of the standing query.

3. The system of claim 2, wherein the event-selection criterion is received from the user when the user selects one of: an object displayed on the interactive console;

and a listing from a drop-down list displayed on the interactive console.

4. The system of claim 2, wherein the interactive console is operable to receive, from the user, a context-based event selection from the list of context-based events and, based on the context-based event selection, the interactive console is operable to present data in varying media formats to the user, the data being associated with the context-based event selected by the user.

5. The system of claim 4, wherein the interactive console is operable to receive a media format selection from the user, the media format selection indicating the preferred media format the user would like presented via the interactive console, and wherein the interactive console is operable to present data in the media format selected by the user.

6. The system of claim 2, wherein the interactive console is in communication with the at least one database via a network.

7. The system of claim 2, further including:

a personality module tailored to one or more sources of data, the personality module capable of identifying and capturing data associated with the defined context-based events as the events occur, the personality module in communication with the at least one database and the query processing unit.

8. A method to facilitate the presentation of data associated with defined context-based events, wherein the data is retrieved from at least one database based upon receiving an event-selection criterion from a user, and wherein the data is in various media formats, the method comprising:

receiving the event-selection criterion from the user via an interactive console;

executing a standing query to continuously poll the at least one database, the standing query including at least one condition generated based on the event-selection criterion received from the user via the interactive console;

identifying the data stored in the at least one database that satisfies the at least one condition of the standing query, the data being captured and stored in the at least one database as the context-based events occur;

providing a list of context-based events associated with the data for display on the interactive console, the list of context-based events satisfying the at least one condition of the standing query, wherein the list of context-based events is automatically updated as data associated with new context based events satisfying the at least one condition is captured and stored in the at least one database during the execution of the standing query providing the data in varying media formats to the user, the data being associated with one or more context-based events selected by the user, wherein the interactive console has a media player for each media format available in the at least one database, and said providing data in varying media formats includes, for each data in a particular media format, providing the data for presentment via a media player associated with the media format.

9. The method of claim 8, further including:

during execution of the standing query, receiving an additional event-selection criterion from a user;

based on the additional event-selection criterion, modifying the at least one condition of the executing standing query; and dynamically updating the list of context-based events for display, wherein the dynamically updated list of context-based events is associated with the data that satisfies the at least one user-modified condition of the standing query.

10. The method of claim 9, wherein the event-selection criterion is received from the user when the user either selects an object displayed on the interactive console or selects a listing from a dropdown list displayed on the interactive console.

11. The method of claim 8, further including:

receiving a media format selection from the user;

receiving a context-based event selection from the user via the interactive console, the context based event selection indicating a context-based event from the list of context-based events; and providing data for presentment to the user, the data being associated with the user-selected context-based event, and in the media format selected by the user.

12. The method of claim 11, further including:

receiving the one or more context-based event selection from the user via the interactive console, the one or more context-based event selection indicating a context-based event from the list of context based events.

* * * * *